US010266633B2

United States Patent
Xu et al.

(10) Patent No.: US 10,266,633 B2
(45) Date of Patent: Apr. 23, 2019

(54) FORMALDEHYDE-FREE PHENOLIC RESINS, DOWNSTREAM PRODUCTS, THEIR SYNTHESIS AND USE

(71) Applicant: THE UNIVERSITY OF WESTERN ONTARIO, London (CA)

(72) Inventors: Chunbao Xu, London (CA); Yongsheng Zhang, Henan (CN); Zhongshun Yuan, London (CA)

(73) Assignee: THE UNIVERSITY OF WESTERN ONTARIO, London, Ontario (CA)

( * ) Notice: Subject to any disclaimer, the term of this patent is extended or adjusted under 35 U.S.C. 154(b) by 0 days.

(21) Appl. No.: 15/119,030

(22) PCT Filed: Feb. 20, 2015

(86) PCT No.: PCT/CA2015/050132
§ 371 (c)(1),
(2) Date: Aug. 15, 2016

(87) PCT Pub. No.: WO2015/123781
PCT Pub. Date: Aug. 27, 2015

(65) Prior Publication Data
US 2016/0355631 A1  Dec. 8, 2016

Related U.S. Application Data

(60) Provisional application No. 61/942,222, filed on Feb. 20, 2014.

(51) Int. Cl.
*C08G 8/04* (2006.01)
*C08G 8/06* (2006.01)
*C08J 3/24* (2006.01)
*C09J 161/06* (2006.01)

(52) U.S. Cl.
CPC ............. *C08G 8/04* (2013.01); *C08G 8/06* (2013.01); *C08J 3/24* (2013.01); *C09J 161/06* (2013.01); *C08J 2361/06* (2013.01)

(58) Field of Classification Search
CPC .. C08G 8/04; C08G 8/06; C07C 69/54; C07C 37/20; C07C 39/16; C07C 67/14; C08J 3/24; C08J 2361/06; C09J 161/06
See application file for complete search history.

(56) References Cited

U.S. PATENT DOCUMENTS 4,048,126 A * 9/1977 Gibbons ................. C08G 8/00
525/534
4,524,164 A   6/1985 Viswanathan
2008/0207796 A1* 8/2008 Clingerman .......... B22C 1/2253
523/144

OTHER PUBLICATIONS

Alonso, M.V., Oliet, M., Perez, J.M., Rodriguez, F., Echeverria, J., 2004. Determination of curing kinetic parameters of lignin-phenol-formaldehyde resol resins by several dynamic differential scanning calorimetry methods, Thermochim. Acta. 419, 161-167.

(Continued)

*Primary Examiner* — Shane Fang
(74) *Attorney, Agent, or Firm* — Hill & Schumacher

(57) ABSTRACT

A resin composition containing the reaction product of a 5-hydroxymethyl furfural (HMF) produced in-situ from e.g., glucose and a phenolic compound. Phenolic compounds include phenol, cardanol and bio-phenol. The resin is heat-curable using cross-linking agents such as tetraethylammonium chloride or lignin, etc.

19 Claims, 10 Drawing Sheets

(56) References Cited

OTHER PUBLICATIONS

Alonso, M.V., Oliet, M., Rodriguez, F., Garcia, J., Gilarranz, M., Rodriguez, J., 2005. Modification of ammonium lignosulfonate by phenolation for use in phenolic resins, Bioresour. Technol. 96, 1013-1018.

Cheng, S., Wilks, C., Yuan, Z., Leitch, M., Xu, C.C., 2012. Hydrothermal degradation of alkali lignin to bio-phenolic compounds in sub/supercritical ethanol and water- ethanol co-solvent, Polym. Degrad. Stab. 97, 839-848.

Cheng, S., Yuan, Z., Leitch, M., Anderson, M, Xu, C.C., 2013. Highly efficient de-polymerization of organosolv lignin using a catalytic hydrothermal process and production of phenolic resins/adhesives with the depolymerized lignin as a substitute for phenol at a high substitution ratio, Ind. Crop. Prod. 44, 315-322.

Li, C., Zhang, Z., Zhao, Z.K., 2009. Direct conversion of glucose and cellulose to 5-hydroxymethylfurfural in ionic liquid under microwave irradiation, Tetrahedron Lett. 50, 5403-5405.

Markovic, S., Dunjic, B., Zlatanic, A., Djonlagic, J., 2001. Dynamic mechanical analysis of the curing of phenol-formaldehyde novalac resins, J. Appl. Polym. Sci. 81, 1902-1913.

Tejado, A., Pena, C., Labidi, J., Echeverria, J., Mondragon, I., 2007. Physico-chemical characterization of lignins from different sources for use in phenol-formaldehyde resin synthesis, Bioresour. Technol. 98, 1655-1663.

Wang, M., Leitch, M., Xu, C., 2009. Synthesis of phenol-formaldehyde resol resins using organosolv pine lignins, Eur. Polym. J. 45, 3380-3388.

Yan, H., Yang, Y., Tong, D., Xiang, X., Hu, C., 2009. Catalytic conversion of glucose to 5-hydroxymethylfurfural over $SO_4^{2-}$/$ZrO_2$ and $SO_4^{2-}$/$7ZrO_2Al_2O_3$ solid acid catalysts, Catal. Commun. 10, 1558-1563.

Yuan, Z., Xu, C.C., Cheng, S., Leitch, M., 2011. Catalytic conversion of glucose to 5-hydroxymethyl furfural using inexpensive co-catalysts and solvents, Carbohydr. Res. 346, 2019-2023.

Yuan, Z., Zhang, Y., Xu, C., 2014. Synthesis and thermomechanical property study of novolac phenol-hydroxymethyl furfural (PHMF) resin, RSC Adv. 4, 31829- 31835.

Zhang, Y., Yuan, Z., Mahmood, N., Huang, S., Xu, C., 2015. Sustainable bio-phenol-hydroxymethylfurfural resins using phenolated de-polymerized hydrolysis lignin and their application in bio-composites, Ind. Crops. Prod. 79, 84-09.

Zhang, Y., Yuan, Z., Xu, C., 2015. Engineering biomass into formaldehyde-free phenolic resin for composite materials, AIChE J. 61, 1275-1283.

Zhao, H., Holladay, J.E., Brown, H., Zhang, Z.C., 2007. Metal chlorides in ionic liquid solvents convert sugars to 5-hydroxymethylfurfural, Science. 316, 1597-1600.

International Search Report for PCT/CA2015/050132 dated May 28, 2015.

Written Opinion for PCT/CA2015/050132 dated May 28, 2015.

\* cited by examiner

FORMALDEHYDE-FREE PHENOLIC RESINS, DOWNSTREAM PRODUCTS, THEIR SYNTHESIS AND USE

FIELD

The present invention relates to a resin composition containing the reaction product of a 5-hydroxymethyl furfural (HMF) produced in-situ from e.g., glucose and a phenolic compound, synthesis of the such resins, and downstream uses and products.

BACKGROUND

Phenol-formaldehyde (PF) resin was the first commercialized synthetic resin having wide application in coatings, adhesives, casting, engineered materials, household products, etc. The discovery of carcinogenic effects of formaldehyde (Zhang et al., 2009) and more stringent environmental regulations to reduce volatile organic compounds (VOCs) in recent years have created a need for improvement in PF manufacture, to reduce formaldehyde emissions during production, for example, or reduce off-gassing during final production stages.

Manufacturers are thus looking for greener and more environmentally friendly alternatives to conventional polymers such as PF. (Netravali and Chabba, 2003) Biomass is increasingly becoming a significant feedstock for fuels and chemicals. (Zakzeski et al., 2010) Together with cellulose and hemicelluloses, lignin constitutes one of the three main components of lignocellulosic biomass. Lignin is a polymer of three monomers: guaiacyl (G); syringyl; and p-hydroxyphenyl propane (p-H)-type. (Tejado et al., 2007) Among the components of its structure, the phenolic group of lignin is of particular interest and has attracted the interest of researchers as a substitute for crude oil based phenol in e.g., phenol-formaldehyde resins. (Effendi, Gerhauser and Bridgwater, 2008)

Phenol has been replaced with lignin and cardanol, for example, but formaldehyde continues to arouse environmental concerns and its exposure levels are regulated in the United States. (Kowatsch, 2010; Hahnenstein et al., 1994) One approach has been to replace PF resins with more expensive resins (Kurple, 1989) despite relatively poor economics.

There has been extensive effort towards using lignin as an alternative to phenol in synthesizing lignin-modified phenol-formaldehyde (LPF) resins, but incorporating lignin directly into the PF synthesis has been a challenge as crude lignin has fewer reactive sites than phenol to react with aldehydes. (Wang et al., 2009) Lignin modification to obtain more reactive functional groups has been commonly practiced to this end, which includes phenolation, (Alonso et al., 2005) methylolation (Alonso et al., 2004), demethylation (Ferhan et al., 2013) and hydrothermal de-polymerization/liquefaction (Cheng et al., 2012; Cheng et al., 2013). The final resin behavior was found to be very dependent on the chemical and physical properties of the lignin. Direct phenolation of lignin due to its simplicity was widely applied for use in phenolic resins. (Alonso et al., 2005)

Glucose is the main building block of cellulose, hemicellulose, and starch, and is the most abundant renewable fixed carbon source in nature. With the projected depletion of fossil resources approaching, glucose could be a future carbon source for fuels (bio-ethanol and bio-butanol, dimethyl furan, etc.) and other chemicals after certain chemical transformations. The transformation of glucose to HMF, a platform chemical, has been demonstrated in water, organic solvents, chloride salts, and ionic liquids. (Yan et al., 2009; Zhao et al., 2007; Li, et al., 2009; Binder and Raines, 2009)

Hexamethylene tetraamine (HMTA), a condensation product of ammonia and formaldehyde is commonly used for curing of novolac-type phenolic resins. Use of HMTA is also restricted due to its decomposition to form ammonia and formaldehyde in curing and applications. (Nielsen et al., 1979; Richmond, et al., 1948) Methylene bridges form between phenolic benzene rings during novolac synthesis with at least one ortho- or para-position remaining on the phenol rings of novolac resin, the general structure of novolac being (Knop and Pilato, 1985):

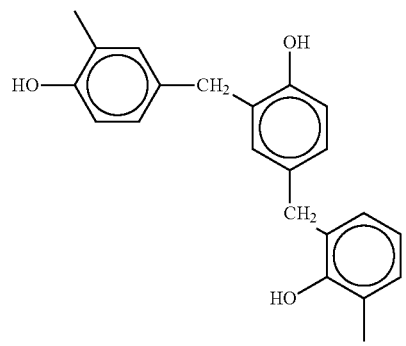

There is the possibility of forming additional methylene bridges by using higher temperatures, but application of this approach is limited by HMTA being a hazardous air pollutant. (Lytle, Bertsch and McKinley, 1998) Thus exploring green harders as substitutes for HMTA for novolac resin curing has also received growing research interest.

Simitzis et al. (1996) produced novolac-type resins cured with mixture of HMTA and one of the following components: the residue from pressing olives and separation of oil, Kraft lignin (KL), hydroxymethylated Kraft lignin (KLH), and cellulose (CEL). The activation energy ($E_a$) and pre-exponential constant (k) of the curing reactions were found to be HMTA<HMTA/KLH<biomass<KL<CEL. It was indicated that although $E_a$ and k vary with different curing agents, the reaction order, n, was practically the same (n=1). However, the mechanism of cross-linking with these new curing agents was not proposed. (Simitzis et al., 1996)

2,6-di(hydroxymethyl)-p-cresol (a), 3,3',5,5'-tetra(hydroxymethyl)-4,4'-isopropylidenediphenol (b), and 2,6-bis (2-hydroxy-3-hydroxymethyl-5-methylbenzyl)-4-methylphenol (c), with the following structures,

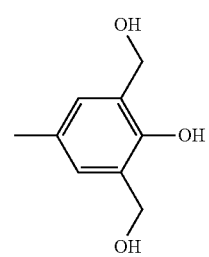

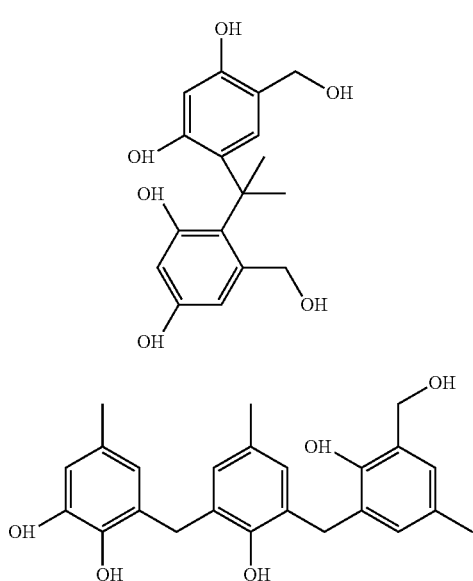

have been used as curing agents for novolac resins. Hard polymers with higher physicomechanical characteristics compared with those cured with HMTA were obtained. (Sergeev et al., 1995) Lignin includes methoxylated phenylpropane structures (Zakzeski et al., 2010) structurally similar to the above curing agents, hence shall follow similar cross-linking mechnism as the above curing agents, when used as an HMTA replacement for curing of novolac PF resins. (Grenier-Loustalot et al., 1996)

Organosolv lignin (OL), which is obtained by treatment of wood or bagasse with various organic solvents, is typically low in sulfur content and of high purity. (Sarkanen et al., 1981) OL is known to be produced commercially as a by-product from cellulosic ethanol processes. Kraft lignin (KL) is a by-product of Kraft chemical pulping of lignocellulosic materials, in which high pHs and considerable amounts of aqueous sodium hydroxide and sodium sulfide are employed at temperatures between 423-453 K for about 2 h to dissolve lignin. KL is produced in large quantities (approx. 70 million tons per year), but is currently used mainly as a low-value fuel in recovery boilers at pulp/paper mills for heat/power generation.

Fiber reinforced composite (FRC) using of PF resin (novolac) as a polymer matrix is a typical application of novolac PF resins. Owing to its high strength, high stiffness and good corrosion resistance, FRC using PF resin has gained popularity in windmill blades, boat, aerospace, automotive, civil infrastructure, sports as well as recreational products. Bio-composites produced with cost competitive green components are more promising. Considerable growth has been seen in the use of bio-composites, such as glass fibers reinforced composites with bio-based polymer matrix materials, in the automotive and decking markets over the past few decades. (Shibata et al., 2008; Suharty et al., 2008)

The most commonly used curing agent for PF novolac is still hexamethylenetetramine (HMTA). Curing conditions, reaction mechanism and kinetic parameters between PF novolac and HMTA or paraformaldehyde have attracted lots of research interests. For instance, fast quantitative $^{13}$C NMR spectroscopy was applied to characterize the degree of polymerization, number average molecular weight, and the number of un-reacted ortho- and para phenol ring. (Ottenbourgs et al., 1995) The curing behavior of novolac resin and paraformaldehyde was discussed by using solid-state $^{13}$C NMR. (Ottenbourgs et al., 1998; Bryson et al., 1983) This technique showed that the formaldehyde/phenol ratio and the degree of the curing conversion can be quantitatively determined. However, it was found that paraformaldehyde was unable to completely cure the novolac. Zhang et al. also investigated the chemistry of novolac resin and HMTA upon curing using $^{13}$C and $^{15}$N NMR techniques. (Zhang et al., 1997; Zhang et al, 1998; Lim et al., 1999) Special attention was given to benzylamines and benzoxazine that were formed as the reaction intermediates during the curing process. Methylene linkages are formed to link novolac molecules with para-para linkages at lower temperatures, while they are thermally less stable than ortho-linked intermediates.

Curing parameter and conditions are critical to properties of phenolic materials. One of the most common analyses was performed by differential scanning calorimetry (DSC). The activation energy of approximately 144 kJ/mol and reaction constant have been reported. (De Medeiros et al., 2003) Their curing reaction, recorded by rheometrics mechanical spectroscopy, was described by a self-acceleration effect and a third order phenomenological equation. (Markovic et al., 2001) Wan et al. further evaluated effects of the molecular weight and molecular weight distribution on cure kinetics and thermal, rheological and mechanical properties of novolac harden by HMTA. (Wan et al., 2011) They reported that the novolac resin with a lower molecular weight exhibited higher reaction heat and reactivity, faster decomposition rate upon heating, lower char residue at 850° C. and the composite materials presented higher flexural strength.

SUMMARY

Here it was found possible to polymerize hexose-generated HMF with a phenolic compound to produce a curable resin. The HMF was generated in situ and found to react with a phenolic compound in a one-pot process.

HMF is preferably generated in situ from glucose, particularly D-glucose. Other hexoses, typically more expensive than glucose, can be used: allose, altrose, mannose, gulose, idose, galactose, fructose, and talose, including mixtures any of the foregoing, including with glucose, and including the D-stereoisomers of any or all of the foregoing.

A counterpart reactant of the HMF is a phenolic compound. In the context of this invention, a "phenolic compound" is a compound containing a hydroxy-substituted phenyl ring in which at least one of the the ortho- and para-carbons of the ring (relative to the carbon bearing the hydroxyl group) is unsubstituted i.e., bears a hydrogen. Such carbon atom is thus available to react to form a phenolic resin as described herein. Such phenolic compounds include phenol itself ($C_6H_5OH$), bio-phenol e.g., phenolated de-polymerized lignin. A product resin can thus be for example, a phenol-HMF (PHMF) resin or a bio-phenol-HMF (BPHMF) resin.

The resin produced is curable so may be e.g., cross-linked to produce downstream products such as an adhesive. It was found possible to cure resins produced with lignin, as opposed, for example, to use of the curing agent HMTA, although HMTA was also demonstrated to be useful with resins of the invention. The resin is useful as a material for producing composite materials.

In embodiments in which the phenolic compound from which the resin is prepared is a bio-phenol (biophenol-HMF, BPHMF), the $M_w$ is preferably from about 2500 to about 4000 g/mol. By "bio-phenol" is meant cardanol or phenolic compounds from lignocellulosic biomass as found in lignin, bark, wood and crop residues, etc. "$M_w$" is expressed in terms of that of linear polystyrene standards as measured by gel permeation chromatography using a differential refractometer.

PHMF resin exemplified herein was thermally cross-linked using bio-based cross-linkers OL and KL in presence of chromium chloride catalysts. Thermal curing of the PHMF resin and lignin indicated that the cross-linking started at about 120° C. and was characterised by an exothermic release of heat. A glassy polymer, characterised by a $T_g$ of 133° C., was indicated by DSC scan. Thermogravimetric test revealed the weight loss peak started at $T_i$~230° C. and maximized at $T_{max}$~400° C. PHMF resin harden with OL/KL was used to produce bio-composite materials containing a high percentage of renewable materials. The lignin (OL/KL) cured PHMF resin thus demonstrated great potential as a substituted for HMTA-cured PF resin system for bio-based thermosets with satisfactory properties.

In one aspect, the invention is thus a method for preparing a cross-linkable phenolic resin. The method includes the step of:

(i) converting a hexose to 5-hydroxymethyl furfural (HMF) in the presence of a phenolic compound and a catalyst that promotes formation of covalent bonds between a carbon atom of the aromatic ring of the phenolic compound and the carbon of the formyl group of the HMF to form the resin.

In an aspect, as in the examples described below, the catalyst can be a Friedel-Crafts alkylation catalyst. The catalyst can include a mixture of $YCl_2$, $YCl_3$ and quaternary ammonium salt, wherein Y is Cr or Cu or Zn. The quaternary ammonium salt can be, for example, tetraethylammonium chloride (TEAC) or tetramethylammonium chloride.

In an aspect, the catalyst of step (i) comprises a Lewis acid.

The catalyst can be selected to catalyze in situ conversion of the hexose to HMF as well as the formation of the resin.

A preferred hexose is glucose, including D-glucose.

The phenolic compound of step (i) can be unsubstituted phenol. The phenolic compound can be a substituted phenol e.g. cardanol. The phenolic compound can be one more bio-phenols obtained from e.g., a lignocellulosic biomass such as one or more of pyrolysis oil, liquefied biomass, lignin, de-polymerized lignin, or liquefied lignin.

Step (i) preferably includes heating a mixture containing the hexose, the phenol and the catalyst to a temperature sufficient to form a liquid mixture. The temperature is typically at least 80° C., or at least 90° C., or at least 100° C., or at least 110° C., or at least 120° C., as such higher temperatures also promote HMF formation.

In embodiments, the molar ratio of hexose:phenolic rings of the phenolic compound of step (i) is between 0.5:1 and 3:1.

In embodiments, the molar ratio of hexose:phenolic rings is at least 1, and the mixture of step (i) includes water. In cases where water is included, it is typically present in an amount of no more than 20 weight percent of the mixture, but it may be no more than 15 weight percent of the mixture, or no more than 10 weight percent of the mixture, or no more than 10 weight percent of the mixture, or no more than 9 weight percent of the mixture, or no more than 8 weight percent of the mixture, or no more than 7 weight percent of the mixture, or no more than 6 weight percent of the mixture.

In embodiments, the water is present in an amount of at least 2 weight percent of the mixture, or of at least 2 weight percent of the mixture, or of at least 3 weight percent of the mixture, or of at least 4 weight percent of the mixture, or of at least 5 weight percent of the mixture, or of at least 6 weight percent of the mixture.

In embodiments, step (i) is conducted for a period of between 1 hour and 12 hours, or between 1 hour and 10 hours, or between 1 hour and 8 hours, or between 1 hour and 6 hours, or between 2 hours and 10 hours, or between 3 hours and 10 hours, or between 4 hours and 10 hours.

Embodiments of the invention can further include a step (ii), removing unreacted sugar from resin formed in step (i), typically, subsequent to step (i). Step (ii) can include water washing.

The invention also includes a method for producing a reaction product comprising a plurality of furyl and phenyl rings, neighboring furyl and phenyl rings being covalently linked to each other by a —$CH_2$— or a —CHOH— group. The method includes:

(a) converting a hexose to 5-hydroxymethyl furfural (HMF) in the presence of phenol and a catalyst that promotes formation of said —$CH_2$— and said —CHOH— groups between the phenol and the HMF.

Other more detailed aspects of this method are described above in connection with the method based on step (i).

In other embodiments, the invention includes a curable reaction mixture for preparing a resin, the mixture comprising: (a) a hexose; (b) a phenol or bio-phenol; and (c) a catalyst, the three components (a), (b) and (c) being as described above, and elsewhere herein.

The invention includes a phenolic resin prepared according to any of the foregoing method embodiments.

The invention includes a polymer resin that is the reaction product of a phenolic compound, e.g., a phenol or bio-phenol, and 5-hydroxymethyl furfural.

In embodiments, such a resin is a reaction product that has carbon atoms of the formyl groups of the HMF covalently linked to cyclic carbon atoms of phenolic moieties i.e., the aromatic rings of phenol molecules incorporated into the resin. In embodiments, the reaction product include carbon atoms of the hydroxylmethyl groups of the HMF that are covalently linked to cyclic aromatic carbon atoms of phenolic moieties, particularly the carbon atoms located at o- and p-positions relative to the hydroxyl group of the phenolic group.

Often, resin has a weight average molecular weight ($M_w$) in the range of about 500 to about 5000 g/mol. In embodiments in which the phenol is an unsubstituted phenol (phenol-HMF resin), a preferred resin has an $M_w$ in the range of from about 500 to about 4000, about 500 to about 3000, about 500 to about 2000, about 500 to about 1500, about 500 to about 1000, about 600 to about 3000, about 600 to about 2500, about 600 to about 2000, about 600 to about 1500 or about 600 to about 1500, or about 600, about 700, about 800, about 900, about 1000, about 1100, about 1200, about 1300, about 1400 or about 1500 g/mol.

In embodiments, a resin of the invention has a polydispersity index ($M_w/M_n$) of between about 2 and about 20, more preferably in the range of from about 2 to about 15, from about 2 to about 10, from about 2 to about 5, or about 2, about 3, about 4 or about 5.

In embodiments, the ratio of phenolic aromatic and furyl rings to sugar is between about 0.5 and about 3, more preferably in the range of from about 0.5 to about 1.5.

Another aspect of the invention is a method of preparing a polymer resin composition, the method comprising the step of:

(A) mixing a resin as described herein and a cross-linking agent.

In embodiments, the cross-linking agent is an organic molecule that has least two hydroxyl groups. The hydroxyl groups can be primary hydroxyl groups. An example of a cross-linking agent is lignin.

The amount of the cross-linking agent relative to resin can be between about 10 wt % and about 30 wt %, more preferably between about 15 wt % and bout 25% wt.

The cross-linking agent can be HMTA.

The invention thus also includes a resin composition that contains a resin of the invention and a cross-linking agent. Again, the crosslinking agent can be an organic cross-linking agent that has at least two hydroxyl groups to permit the agent to take part in a cross-linking reaction with aromatic ring carbons of phenol moieties of the resin.

The invention also includes a method for heat-curing a resin composition, which involves heat-curing the resin composition described above by heating the resin composition to that the composition becomes cured. Heating the resin composition can include heating the composition to a temperature of between about 100° C. and about 200° C., more preferably to between about 120° C. and about 180° C. Heating the resin composition can be for a period of between about 5 and about 120 minutes, more preferably between about 30 and about 60 minutes.

The invention also includes the cured composition obtained from an embodiment of the curing method described above.

A cured composition of the invention can also be described as including a cross-linked polymer, wherein the polymer comprises monomeric units of HMF and phenol or bio-phenol, and molecules of the polymer are cross-linked to each other by reaction with a polyhydroxyl compound. The polyhydroxyl compound can be lignin.

The cured composition can be, for example, an adhesive.

Other embodiments of the invention are discussed throughout this specification. Any embodiment discussed with respect to one aspect of the invention applies to other aspects of the invention as well and vice versa. The embodiments in the detailed examples are understood to be embodiments of the invention that are applicable to all aspects of the invention.

The use of the word "a" or "an" when used in conjunction with the term "comprising" in the claims and/or the specification may mean "one," but it is also consistent with the meaning of "one or more," "at least one," and "one or more than one."

The term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive.

As used in this application, the words "comprising", "having", "including" or "containing" and any of their forms, are inclusive or open-ended and do not exclude additional, unrecited elements or method steps.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

BRIEF DESCRIPTION OF FIGURES

Embodiments will now be described, by way of example, reference being made to the accompanying drawings, in which.

DETAILED DESCRIPTION

Figure 1:
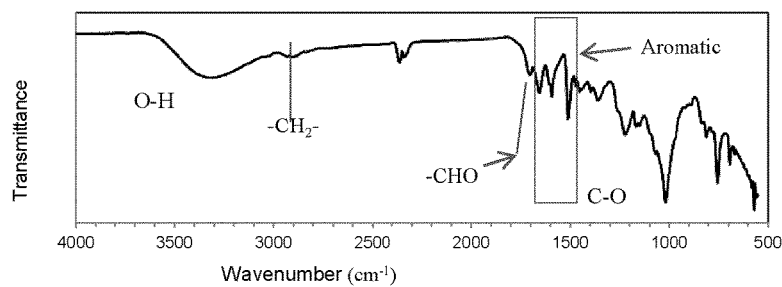
FIG. 1 is an FTIR spectrum of PHMF resin obtained from glucose and phenol.

The transformation of glucose to 5-hydroxymethyl furfural (HMF) has been accomplished in water, organic solvents, and ionic liquids. (Yan et al., 2009; Zhao et al., 2007; Li et al., 2009; Binder and Raines, 2009) Among a number of metals, Zr and Cr have been found to be effective catalysts for conversion of glucose to HMF. In the presence of $SO_4/ZrO_2$ and $SO_4/ZrO_2$—$Al_2O_3$ catalysts, glucose can be converted into HMF with 48% yield in water solution. (Yan et al., 2009) Zhao, et al., (Zhao et al., 2007) found that chromium chlorides, $CrCl_2$ and $CrCl_3$, combined with alkyl-imidazolium chloride ionic liquids catalyzed the conversion of glucose to HMF at a yield of up to 69%. Li et al. (2009) obtained 91% conversion of glucose into HMF using Zhao's catalyst system under microwave irradiation. Binder and Raines (2009)[21] found that quaternary ammonium halo and alkaline metal halo (Cl, Br) salts in a polar aprotic organic solvent can replace ionic liquids as the co-catalyst in the chromium chloride catalyzed conversion of glucose to HMF. Yields as high as 80% were obtained.

Furfural has been known to react with phenol under both basic (Wu and Fu, 2006) and acidic (Long et al., 2008) conditions to form phenolic polymers. Here, it was found possible to react HMF and phenol or bio-phenol, the HMF having been generated in situ i.e., in the presence of phenol or bio-phenol with which the HMF reacts to produce a phenolic resin. Glucose was used as a source stock for producing HMF in situ.

PHMF Resin Formation

Conversion of glucose to HMF can be achieved with the ionic liquid tetraethylammonium chloride. (Zhao et al., 2007; Yuan et al., 2011) Previous work showed that both $CrCl_2$ and $CrCl_3$ catalyze conversion of glucose to HMF through a fructose intermediate, but $CrCl_2$ gave higher HMF yield than $CrCl_3$. The experimental results in Table 1 and Table 2 show that in the reaction system used (120° C. with $CrCl_2/CrCl_3$/TEAC catalyst with and without water), glucose conversions were in the range of 90-100%, while a very low concentration of free HMF (mostly <1.5 wt %) was detected, implying an in-situ consumption of HMF after its formation via phenol-HMF resinification. The phenol-HMF resinification reaction was also evidenced by the considerable conversion of phenol (36-63% as per Table 1, or 68-92% from Table 2, depending on phenol/glucose molar ratio) and the large molecular weights ($M_w$ of 700-900 g/mol) of the resultant polymer materials—PHMF resins.

TABLE 1

Results for the synthesis of PHMF resin without water solvent at 120° C.

| Ph/Glu | Catalyst C1/C2/C3 | Time | Conversion | | | HMF |
|---|---|---|---|---|---|---|
| (mol/mol) | (M/M/M) | (h) | Ph | Glu | $M_w$* | (wt %) |
| 1:0.6 | .02/.01/.06 | 3 | 35.8 | 98.8 | 650 | 1.43 |
| 1:0.9 | .02/.01/.06 | 3 | 55.1 | 93.8 | 730 | 0.91 |
| 1:1.2 | .02/.01/.06 | 3 | 56.7 | 90.1 | 740 | 1.25 |
| 1:1.5 | .02/.01/.06 | 3 | 63.1 | 91.7 | 760 | 1.37 |
| 1:0.9 | .02/.01/.06 | 5 | 59.3 | 96.8 | 740 | 1.01 |
| 1:0.9 | .03/.00/.06 | 3 | 39.1 | 69.4 | 680 | 0.98 |
| 1:0.9 | .00/.03/.06 | 3 | 47.8 | 94.1 | 710 | 0.51 |
| 1:0.9 | .00/.03/.00 | 3 | 41.0 | 92.1 | 730 | 1.11 |
| 1:0.9 | .02/.01/.00 | 3 | 40.2 | 92.2 | 750 | 0.99 |
| 1:0.9[a] | .02/.01/.06 | 3 | 83.8 | 99.1[a] | 800 | 0.90 |

Abbreviations:
Ph = phenol,
Glu = glucose,
C1 = $CrCl_2$,
C2 = $CrCl_3$,
C3 = TEAC.
*All PDIs (polydispersity index, $M_w/M_n$) of the PHMF resin are in the range of 3-4.
[a]Reagent grade HMF was used.

TABLE 2

Results for synthesis of phenol-HMF resin in a pressure reactor with water as solvent at 120° C.

| Ph/Glu | $H_2O$ | Time | $M_w$ | Conversion (%) | | HMF |
|---|---|---|---|---|---|---|
| (mol/mol) | (wt %) | (h) | g/mol | Ph | Glu | (wt %) |
| 1:1.5 | 6 | 5 | 700 | 67.5 | 98.7 | 1.10 |
| 1:1.7 | 6 | 5 | 760 | 72.1 | 89.4 | 0.67 |
| 1:2 | 6 | 5 | 760 | 69.0 | 80.4 | 1.46 |
| 1:2 | 6 | 6 | 810 | 73.0 | 93.7 | 0.75 |
| 1:2 | 6 | 8 | 900 | 91.7 | 98.9 | 0.65 |

Catalyst concentration: $CrCl_2/CrCl_3$/TEAC = 0.02/0.01/0.03 (M/M/M).

Results also showed that using either $CrCl_2$/TEAC or $CrCl_3$/TEAC (entries 6 and 7 in Table 1) catalyst system, the phenol and glucose conversions were much lower than those with the $CrCl_2/CrCl_3$/TEAC catalysts, particularly in the case of $CrCl_2$/TEAC. This is likely because $CrCl_2$, although more active in the formation of HMF, is less acidic than $CrCl_3$, and the resinification/condensation reactions between phenol and HMF require a Lewis acid catalyst.

It has been shown previously (Yuan et al., 2011; Moubarik et al., 2009) that 120° C. is a suitable temperature for the conversion of glucose to HMF, and this was the temperature used here.

The results presented in Table 1 show that after 3 hours at a fixed catalyst concentration, increasing the glucose/phenol molar ratio from 0.6 to 1.5 resulted in a steady increase in phenol conversion from 36% to 63%, and that the conversion of glucose was over 90%. When the glucose/phenol ratio was increased above 1.5, the initial magnetic stirring was found to be difficult, presumably due to the high melting point of glucose and its low solubility in phenol. For glucose/phenol ratios higher than 1.5, water was added to facilitate dissolution of glucose. To maintain the reaction temperature of water-containing reaction medium (120° C.), a pressure reactor was thus used. Since water is a by-product of both the conversion of glucose to HMF and the condensation reaction of phenol with HMF, the addition of water to the reaction system is not favorable for the resin synthesis. The reactions with water present (Table 2) were thus conducted for a longer time than the experiments without water (Table 1). Comparing the results of Table 1 and Table 2, it can be seen that phenol conversion at glucose/phenol molar ratios of 1.5:1 to 2:1 with the addition of water in the pressure reactor (Table 2) were much higher (68-92%) than lower glucose/phenol ratio. This suggests the reaction at a higher glucose/phenol molar ratio favors the conversion of phenol into PHMF resins. As also shown in Table 1 and Table 2, the molecular weight of the resins also increased with increasing glucose/phenol ratio.

The positive effects of reaction time on the phenol conversion and PHMF formation reaction are shown by the results presented in Table 2. Both phenol and glucose conversion increased from 69% to 92% and 80 to 99%, respectively, as the reaction time increased from 5 h to 8 h, accompanied by an increase in $M_w$ of the PHMF products. Entries 1-4 in Table 1 show that after 3 hours, most of the glucose was converted. Comparing entries 2 and 5 in Table 1, the increase in phenol conversion was more than that of glucose for another 2 hours of reaction. This may be because the polymer chain predominantly terminates with HMF as shown in the possible reaction mechanism for the formation of phenol-HMF resin proposed in Scheme 1.

SCHEME 1

Reaction mechanism for the synthesis of phenol-HMF resin:

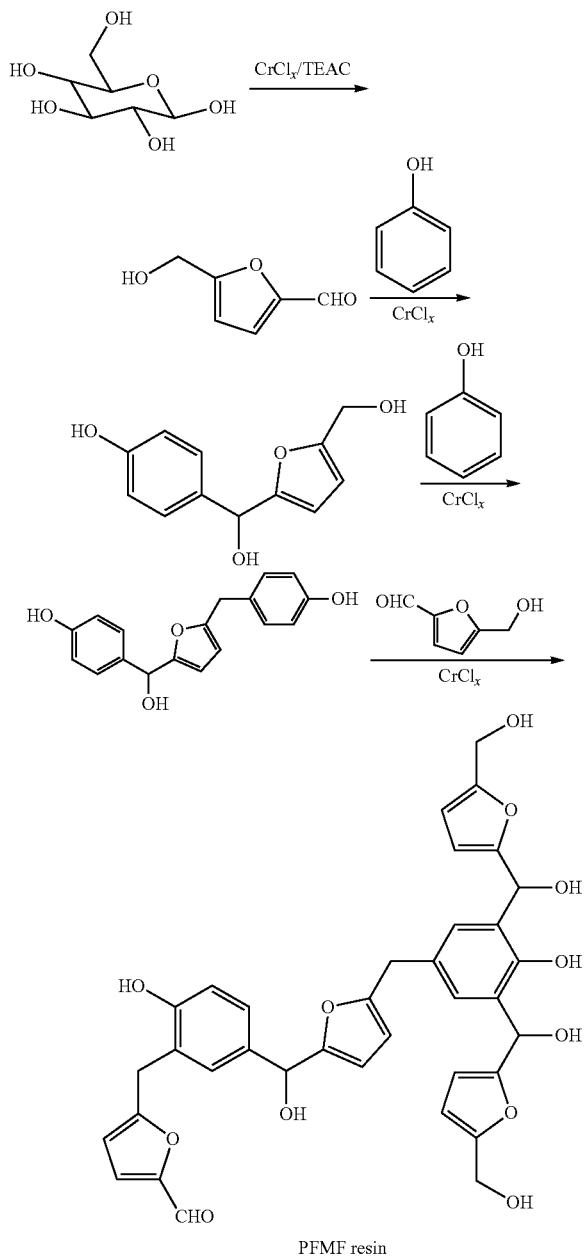

PFMF resin

In the presence of CrCl$_2$, CrCl$_3$ and TEAC, glucose can be isomerized to fructose, and fructose is then dehydrated, losing three molecules of water to form HMF. (Zhao et al., 2007; Binder and Raines, 2009; Yuan et al., 2011) In the presence of a Lewis acid (CrCl$_3$), the electron rich carbons of the para- and ortho-positions of phenol can undergo nucleophilic addition with the electrophilic aldehyde group of HMF. In the presence of a Lewis acid, the hydroxymethyl group in HMF can also react with the phenol carbons located in the para- and ortho-positions with respect to the hydroxyl group of phenol through a Friedel-Crafts alkylation mechanism. The final product is a resin with a structure similar to that of branched novolac phenolic resins but with some benzene rings replaced by furan rings and some of the methylene linkages replaced by hydroxyl methylene linkages. Since furan is also an electron-rich aromatic ring, reactions between furan rings and aldehyde or hydroxylmethyl groups in HMF may also occur. This likely contributes to the high glucose consumption.

It has been observed (Yuan et al., 2011; Girisuta, Janssen and Heeres, 2006; Huber, Iborra and Corma, 2006) that the presence of a moderate amount of water can improve conversion of glucose to HMF, but that larger amounts of water promote decomposition of HMF into levulinic acid and decreased HMF yield. In the present system, the newly formed HMF quickly reacted with phenol after its formation, which apparently drove the dehydration reaction forward to maintain a low HMF concentration and attenuate its conversion to byproducts. This was confirmed by GC-MS analysis as no levulinic acid was detected. These experimental results thus showed the benefit of an in situ one-pot reaction. It is known that under acidic conditions, (Hu et al., 2011; Dee and Bell, 2011) glucose can be converted to humin, a dehydration polymer of dehydrated glucose, HMF, and degradation products of HMF. There is thus the possibility that the resin formed is a mixture of PHMF and humin, but the presence of humin may not significantly affect the usefulness of the PHMF product as long as it can be incorporated into cured product. The final resin was found not to be soluble in water, but soluble in most organic solvents including acetone, tetrahydrofuran, and alcohols. This indicated that the resin product was not an oligomer of glucose, but rather a highly dehydrated polymeric product. The PHMF resin can be purified by dissolving the reaction mixture in acetone, then precipitating it into water/methanol to remove catalysts and unreacted glucose and phenol. For phenol/glucose=1:2, 8 h reaction, the yield after purification was 57% (weight of product divided by feed, theoretical yield is 75%). Since the catalysts are non-toxic and are also active in promoting resin curing reactions and the unreacted phenol can be reacted in the curing stage, in practice, further purification is needed.

The IR spectrum of the synthesized resin shown in FIG. 1 shows absorption bands in the 1400-1600 cm$^{-1}$ region characteristic of aromatic rings, that is, carbon-carbon stretching vibrations of at 1592 cm$^{-1}$, 1505 cm$^{-1}$, and 1450 cm$^{-1}$, attributable to phenol and furan ring structures in the PHMF resins. See the pathway of Scheme 1. The absorptions at 1230 cm$^{-1}$ and 1000 cm$^{-1}$ indicate the presence of conjugated and un-conjugated C—O stretching, respectively. The absorption at 748 cm$^{-1}$ is attributable to out-of plane bending of aromatic C—H bonds. The absorption at 3275 cm$^{-1}$, 2910 cm$^{-1}$ and 1702 cm$^{-1}$ can be attributed to OH, methylene (—CH$_2$—) and C=O (aldehyde) stretching, respectively, which is evidence of the condensation reaction of both the aldehyde and hydroxymethyl groups in HMF with phenol para- and ortho-reactive sites to form PHMF —CH(OH)— and —CH$_2$— linkages, as shown in Scheme 1.

Figure 2:
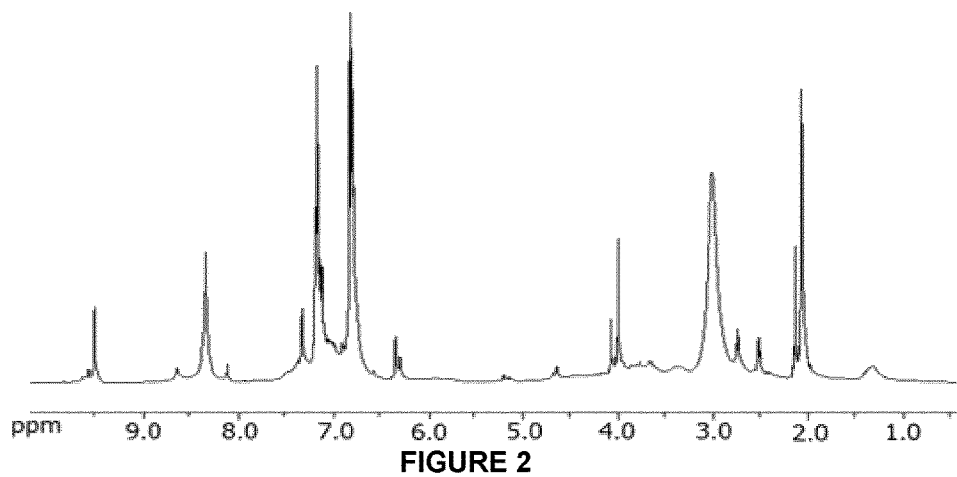
FIG. 2 is an $^1$H-NMR spectrum of PHMF resin obtained from glucose and phenol.

In the proton NMR spectrum of the PHMF resin, shown in FIG. 2, except for the water peak (2.8-3.1 ppm) and acetone peak (d$_6$-acetone 2.0 ppm), most peaks are attributable to hydrogen atoms bound to aromatic carbon atoms (6-8 ppm) i.e., protons of phenolic and HMF rings in the PHMF resin. The peak at 9.5 ppm is the proton of aldehyde group from incorporated HMF. The peak at 8.3 ppm is due to the hydroxyl proton of the phenol ring with hydrogen bonding. The peak at 4.0 ppm can be attributed to methylene protons.

Figure 3:
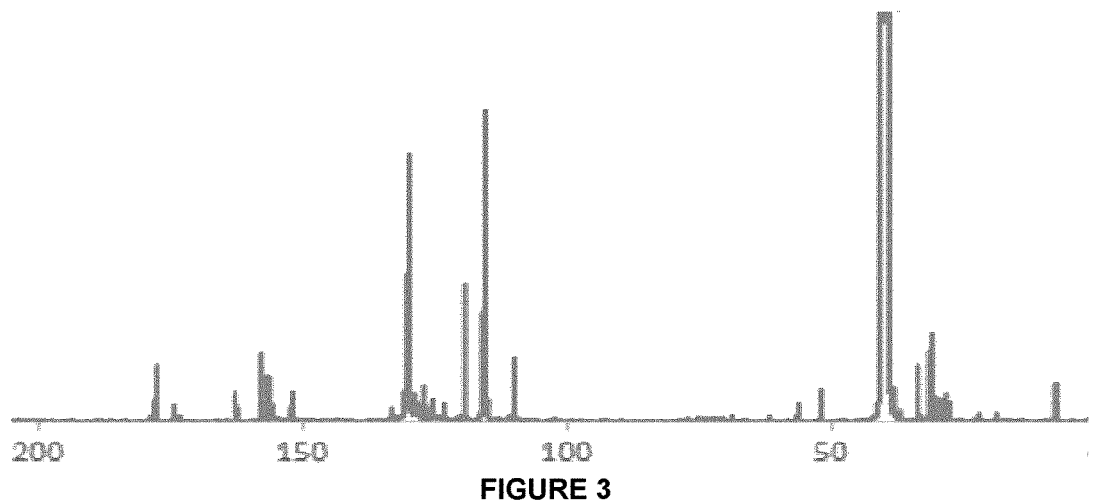
FIG. 3 is a $^{13}$C-NMR spectrum of PHMF resin obtained from glucose and phenol.
Figure 4:
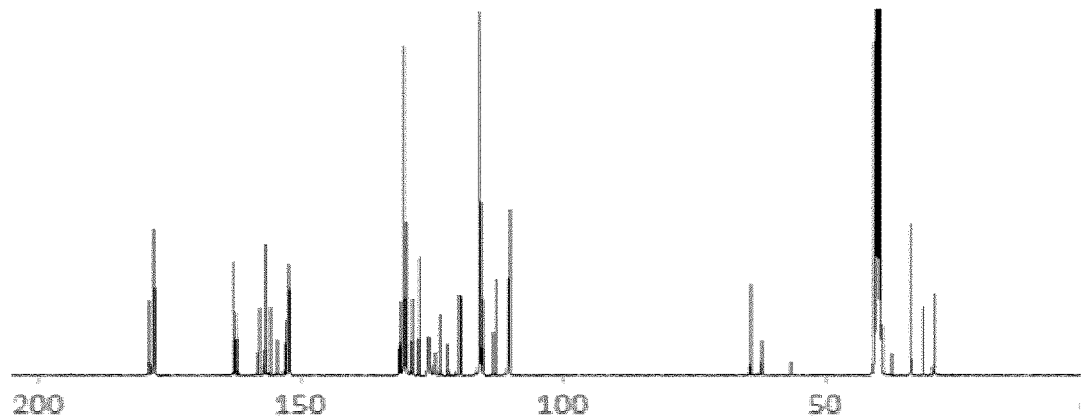
FIG. 4 is a $^{13}$C-NMR spectrum of PHMF resin synthesized from reagent HMF and phenol.

The structure of the PHMF resin was also characterized using $^{13}$C-NMR. See FIG. 3. The peaks can be assigned as follows: aldehyde carbon, 178 ppm; carbon adjacent to oxygen of the furan ring, 162 ppm; hydroxyl-substituted phenolic carbons, 156 and 157 ppm; carbon adjacent to oxygen and aldehyde group of the furan ring, 152 ppm; carbon on phenolic ring at the meta position of OH connected carbon, 129 ppm; carbon on furan ring meta to oxygen, 119 ppm; carbon on phenolic ring at the ortho-position of OH bound carbon, 115 ppm; carbon on furan ring meta to oxygen and CHO, 110 ppm; methylene and methine groups, 52, 56 ppm; and solvent, $d_6$-dimethyl sulfoxide, 40 ppm. The remaining unidentified peaks may be ascribed to carbons of glucose polymers. The $^{13}$C-NMR spectrum for PHMF resins derived from phenol and glucose are very similar to the PHMF synthesized from phenol and reagent-grade pure HMF. See FIG. 4.

Elemental analysis (C, H, O) revealed that the purified PHMF resin at a phenol/glucose ratio of 1:1.5 had C, H, O content (wt. %) of 66.2, 5.5, 27.0. The PHMF derived from reagent HMF had H, C, O content of 70.7, 4.8, 24.3, similar to the H, C, O content (71.3, 5.0, and 23.8 wt. %) that would result from a PHMF resin composed of alternating phenol-HMF units. The O content of the PHMF resin from phenol-glucose is about 11% higher than that of the phenol-HMF resin, possibly due to a higher ratio of glucose to phenol.

BPHMF Resin Formation

The lignin extracted from the residues of enzymatic hydrolysis process is called enzymatic hydrolysis lignin (HL). (Jin et al., 2010) Acid hydrolysis lignins, commercial by-products of the acid saccharification process of wood, is part of lignocellulosic residues. (Dizhbite et al., 1999) Lignin, cellulose and other carbohydrates can be present as the main components of hydrolysis residues. Other types of lignin e.g., alkali-soluble kraft lignin, water-soluble ligno-sulphonates, organosolv lignin, can also be used for synthesis of bio-phenol HMF (BPHMF) resins. The BPHMF resin was synthesized with the phenolated de-polymerized HL (PDHL), following the same synthesis method of PHMF. The gross yield of synthesized BPHMF resins was 85% under the conditions as described in the experimental section (14.10 g phenolated DHL (containing 50 wt % phenol and 50 wt % DHL), 13.5 g (0.075 mol) glucose, and 3 g water and a total of 0.3 g catalysts were reacted at 120° C. for 8 hours). The yield of BPHMF resins could be further increased by increasing the glucose level in the reaction substrate.

Characterizations of DHL, PDHL, and BPHMF resins

The original HL used in this work was from enzymatic hydrolysis of hardwood, and it has a weight average molecular weight, $M_w$>20,000 g/mol. The approximate molecular weight and distribution obtained from BPHMF resin and its comparison with DHL and PDHL are presented in FIG. 5 and Table 3.

TABLE 3

Average molecular weights and polydispersity of the DHL, PHMF and BPHMF resin

| | $M_n$ (g/mol) | $M_w$ (g/mol) | Polydispersity Index (PDI) |
|---|---|---|---|
| DHL | | ~1400-1500 | (—) |
| PDHL | 870 | 2107 | 2.42 |
| BPHMF | 1082 | 9030 | 8.34 |

Figure 5:
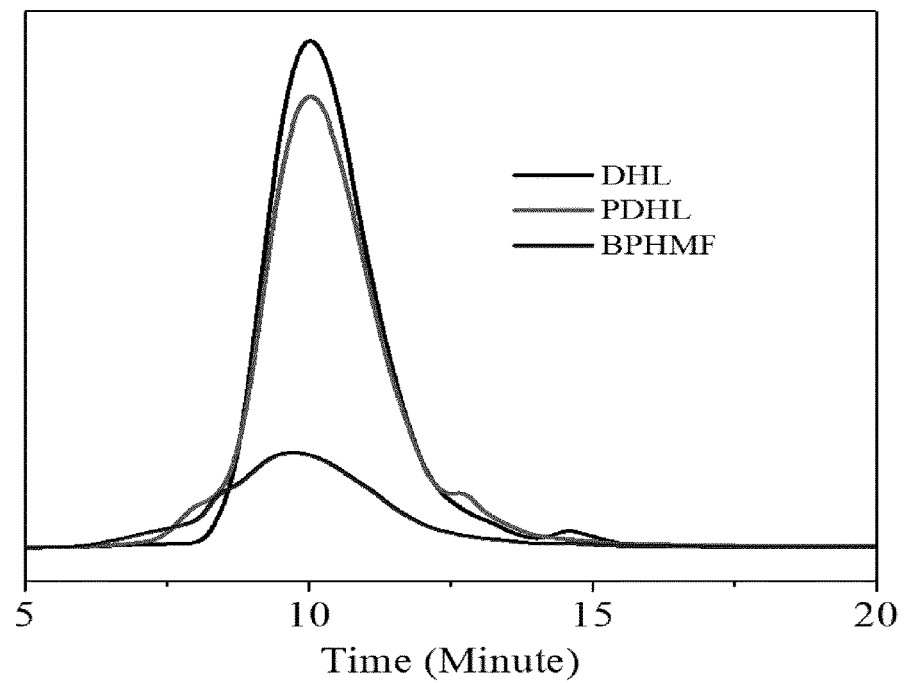
FIG. 5 shows molecular weight distributions of the DHL (uppermost curve), PHMF (middle curve) and BPHMF (lower curve) resin.

GPC profiles of DHL and PDHL indicate that the DHL and PDHL have similar molecular weight and distribution, which is consistent with the low phenol conversion (4%) in the phenolation process. Even at such low phenol conversion, in average two third of DHL molecules were phenolated phenol, due to the large difference in the molecular weights of DHL and neat phenol. The GPC profile of BPHMF exhibited much broader weight distribution and a larger value of polydispersity than DHL and PDHL. More interestingly, most components of BPHMF present a lower retention time than PDHL, as indicated by the peak of GPC profiles (FIG. 5). Upon condensation with glucose-derived HMF in the resinification process, the molecular weight and PDI of the PDHL increased three times, demonstrating that the resinification reactions proceeded well, and the BPHMF resins have broad molecular weight distribution (PDI=8.34), and large $M_w$ (9030 g/mol) and $M_n$ (1082 g/mol). Based on the structure analysis and related reference on PHMF resin, (Yuan et al., 2014) a reaction mechanism can be proposed by Scheme 1.

SCHEME 1
Reaction mechanism of the synthesis of BPHMF resin from bio-phenols and in-situ generated HMF

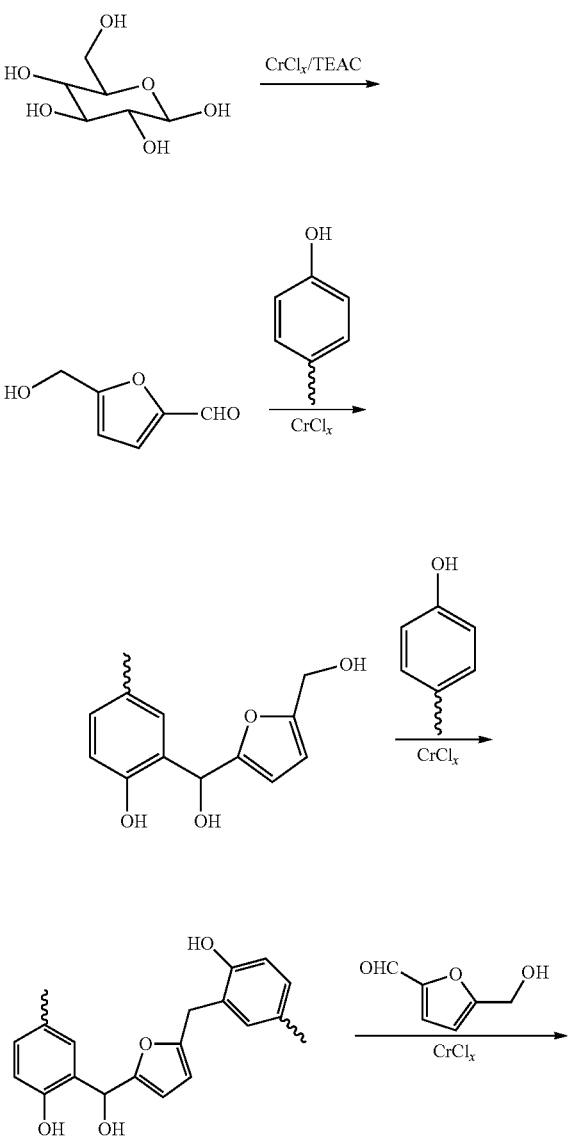

-continued

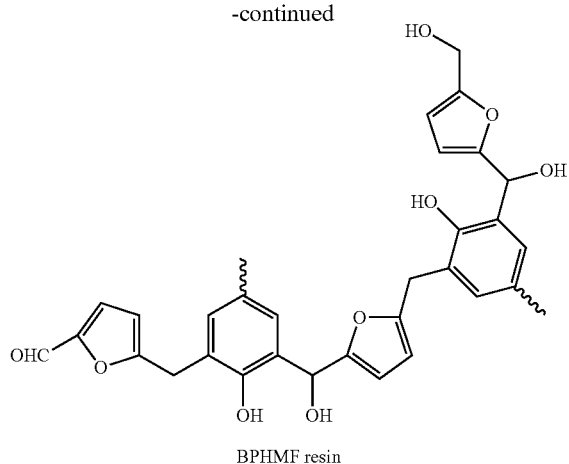

BPHMF resin

Figure 6:
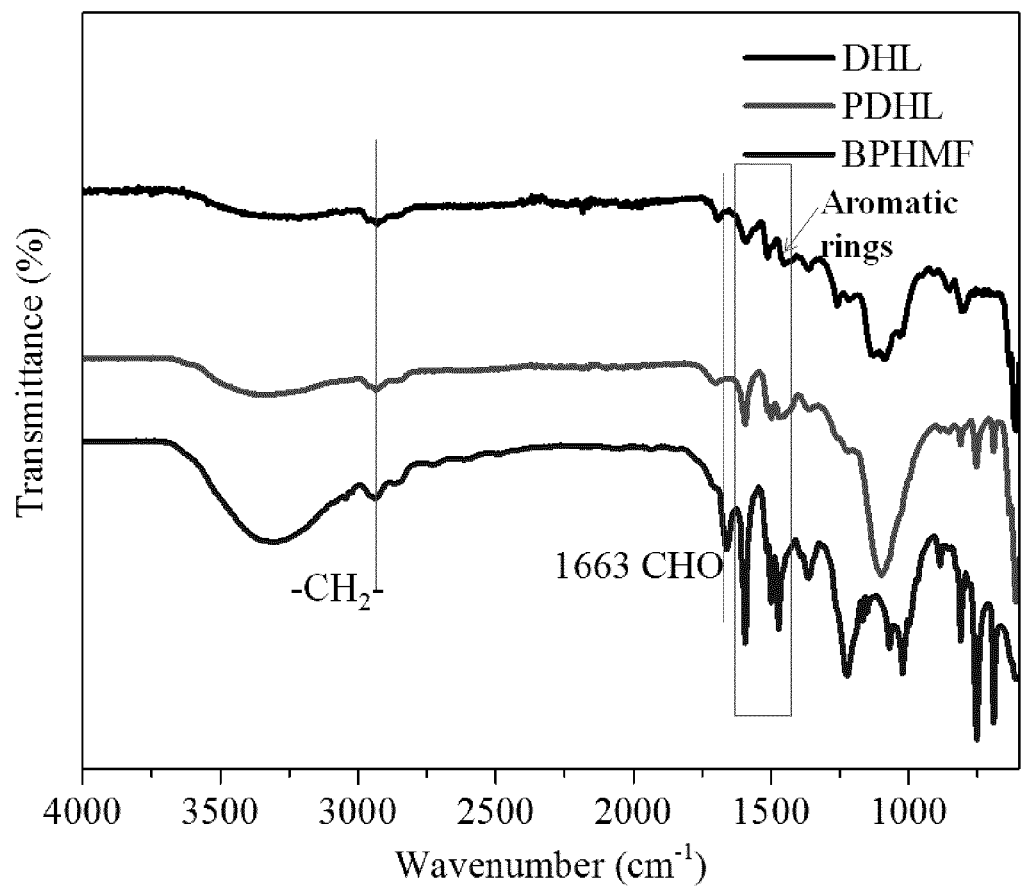
FIG. 6 shows FTIR spectra of the BPHMF resin (lower trace), DHL (upper trace) and PDHL (middle trace)

FIG. 6 shows that the infrared spectra of BPHMF resin. The BPHMF resin has similar chemical structure to PF resin. There is typical hydroxyl group absorption between 3400 and 3387 $cm^{-1}$ and C—H stretching between 2980 and 2875 $cm^{-1}$. Sharp absorbance of carbon-carbon stretching and aromatic vibration is at 1592 $cm^{-1}$, representing abundance of aromatics of phenol, lignin and HMF. Aromatic ring vibration is at 1510 and 1450 $cm^{-1}$, H—O bending at 1355 $cm^{-1}$, methoxy group at 1260 $cm^{-1}$, aromatic ring stretching with oxygen around 1215 $cm^{-1}$, guaiacyl band (C—O) at 1015 $cm^{-1}$, and aromatic ring out of plane bending with hydrogen at 748 $cm^{-1}$. The CHO (carbonyl) stretching at 1663 $cm^{-1}$ is present due to the carboxylic acid among BPHMF because additional aldehyde groups remained.

3.2 Curing PHMF Resins

Figure 7:
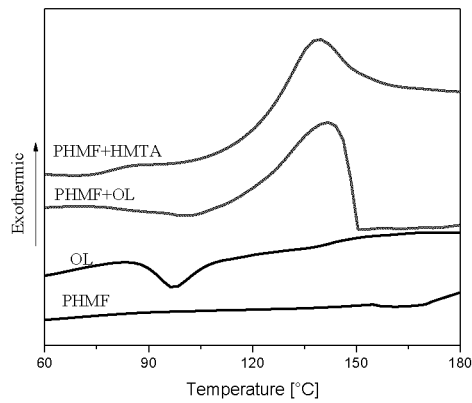
FIG. 7 shows DSC curves of PHMF, OL, PHMF with HMTA, and PHMF with OL.

DSC measurement (FIG. 7) showed that the phenol/glucose ratio=1:2 resin can be cured using organosolv lignin (OL, 20 wt. %)—regarded as a green curing agent, exhibiting an obvious exothermal peak at about 142° C. In contrast, the DSC curves for the PHMF resin and OL separately have no obvious exothermic behavior observed. The curing reaction is a typical Fridel-Craft alkylation reaction between the hydroxylalkyl groups in the lignin and the aromatic rings (phenol and furan rings) in PHMF under the catalysis of the $CrCl_3$. (Fadel et al., 1987) As was expected, PHMF resin is curable with HMTA, which presents an apparent curing behavior at 139° C., similar with those between PHMF and OL, as well as PF and HMTA. (De Medeiros et al., 2003) The curing of both resole and novolac PF resins can release formaldehyde. For resole, because each benzene ring connected several two to three hydroxymethyl groups, when being cured, $CH_2$—O—$CH_2$ ether linkage first formed between two hydroxymethyl groups of different benzene rings, then further heating of the ether linkage will release formaldehyde and form more stable methylene linkage between two benzene rings. For the curing of novolac PF resin, although it is a linear or slightly branched polymer with only methylene linkage between benzene rings, its curing usually needs hexamethylene tetraamine (HMTA) as curing agent, which is always accompanied with the formation of formaldehyde during the cross-linkage. The present PHMF resin has similar structure with novolac, it can also be curable by HMTA, which will emit formaldehyde. To avoid the release of toxic chemicals, using green curing agent, such as OL or KL, is more environmentally friendly.

The curing reaction between OL/KL and novolac has not been explored yet, to the best of the authors' knowledge. The chemical structures of both PHMF resin and OL/KL are complicated and existing hydroxymethylene group would apparently interfere the structure analysis if the alkylation is the mechanism. Under this condition, 1, 4-bis-(Hydroxymethyl) benzene has been an ideal model compound to represent OL/KL for studying these reactions to elucidate the curing mechanism of PHMF resin and lignin.

Figure 8:
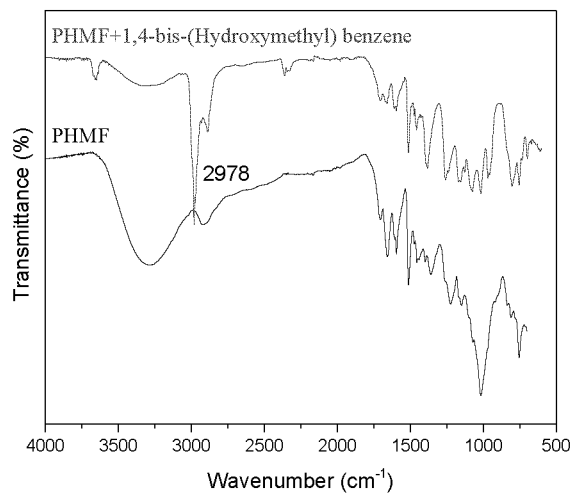
FIG. 8 shows FTIR spectra of PHMF (bottom trace) and cured PHMF with 1, 4-bis-(Hydroxymethyl)benzene (upper trace)

The monitoring along the curing process by FTIR spectroscopy (FIG. 8) presents that hydroxyl group of 1, 4-bis-(Hydroxymethyl)benzene almost disappeared after curing. The evolution of the characteristic functional groups taking part in the curing process allowed to confirm the appearance of asymmetric stretching vibration band of $CH_2$ groups, observed at 2978 $cm^{-1}$.

SCHEME 2
Proposed curing reaction mechanism

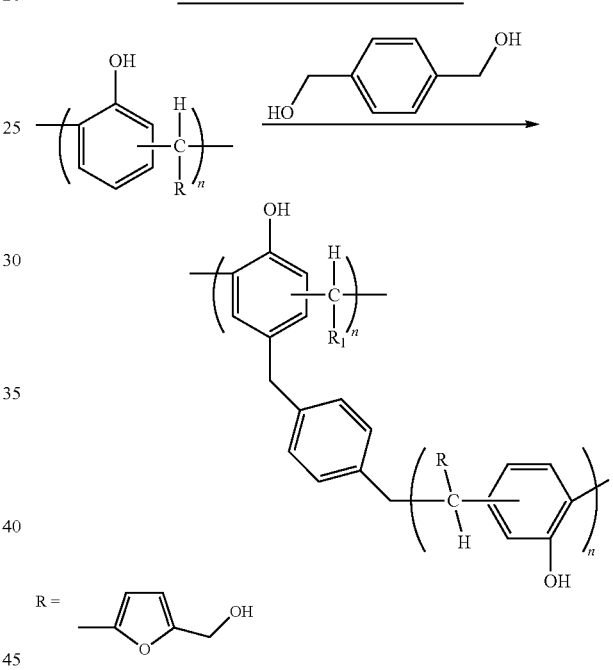

Figure 9:
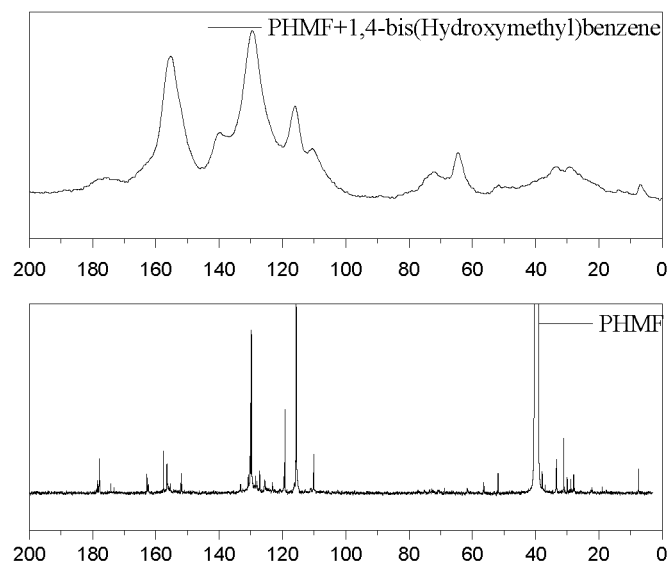
FIG. 9 shows $^{13}$C NMR spectra of PHMF (bottom panel) and cured PHMF with 1, 4-bis-(Hydroxymethyl)benzene (upper panel)

The carbon ($^{13}C$) NMR spectrum in FIG. 9 indicates key differences between PHMF resins before and after curing with 1, 4-bis-(Hydroxymethyl)benzene. It is noted that the peak corresponding to un-substituted aromatic carbon at the para-position in PHMF resin (119 ppm) disappeared, indicating some group attached to this para-phenolic carbon. While the formation of substituted para-phenolic carbon (139 ppm) after curing indicates that hydroxyl group from model compound reacted with PHMF. Furthermore, the peaks assignable to the extra hydroxymethylene functional groups are also detected at 72 and 64 ppm. One possible explanation for these findings is associated to the alkylation process of PHMF and 1, 4-bis-(Hydroxymethyl)benzene by catalytic effect of chromium chloride. (Elavarasan et al., 2011) Based on the above analysis, the curing mechanism between PHMF and OL/KL is proposed and depicted in Scheme 2.

Characterization for Downstream Processing of the PHMF Resin (Glass Transition, Curing and Thermal Stability Tests)

Having prepared and characterized the Ph/HMF resin, experiments were performed, which established the feasibility of use of the resin as a precursor to other materials. In a first example, the resin was cured using the natural polymer organosolv lignin (20 wt. %) or HMTA.

The glass transition temperature ($T_g$) establishes the temperature within which the resin is well used and thus it is believed to be the an important parameter of polymeric and composite materials. There have been many methods developed in determining $T_g$ in polymer systems. (Cai and Lin, 2005) Neat resin was cured with OL and KL respectively with four weight percent, 10%, 20% 30%, and 40%. All the cured resins were investigated with their glass transition temperature. As presented in Table 4, the $T_g$'s range from 110 to 135° C., with a maximum at 20% wt of cross-linkers. Apparently the addition of OL/KL significantly increased the using temperature of PHMF resin. At the same time, low ratio (10%) of OL/KL is not sufficient for cross-linkage but 30% wt and 40% wt of OL/KL are of over quantity and thus resulted in weaker $T_g$, the $T_g$ keep decreasing from 30% to 40% is a good example. Optimal curing agent ratios are determined to be 20% of resin. It shall be noted that PHMF resin cured with OL/KL has the same $T_g$ with those PF novolac, which was reported to be 134° C. (Pérez et al., 2011)

TABLE 4

Glass transition temperature of PHMF resin cured with OL/KL at varying addition amounts

| Sample ID: PHMF + OL (wt %) | Tg/° C. | Sample ID: PHMF + KL (wt %) | Tg/° C. |
| --- | --- | --- | --- |
| 10 | 120 | 10 | 119 |
| 20 | 133 | 20 | 128 |
| 30 | 130 | 30 | 125 |
| 40 | 120 | 40 | 123 |

Figure 10:
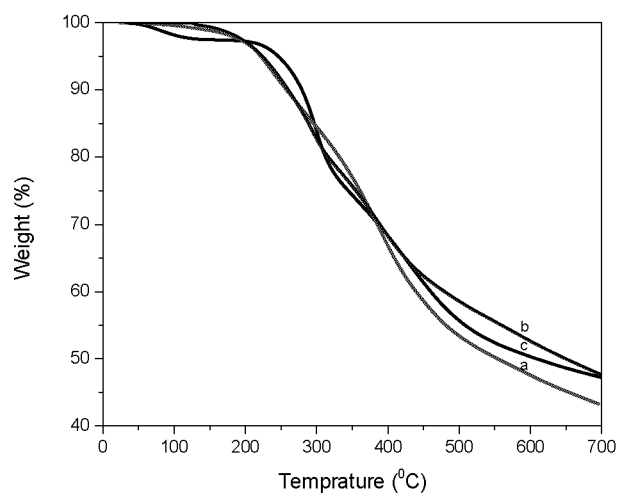
FIG. 10 shows thermal stability of PHMF resin cured with (a) OL, (b) KL and its comparison with that cured by (c) HMTA.

TGA experiments were performed to examine the thermogravimetric behaviour and thermo properties of the PHMF polymer hardened with OL/KL/HMTA. FIG. 10 shows the TGA thermograms of the cured PHMF resin upon heating. From the TGA data, thermal stability factors, including the initial decomposition temperature, $T_i$, the temperature of 50% weight loss, $T_{50}$%, the temperature of maximum decomposition rate, $T_{max}$, and the residual mass at 700° C. for the cured PHMF resin were determined and are presented in Table 5. The results show that the PHMF polymer is thermally stable up to about 222° C. (the $T_i$) with high $T_{max}$ for OL (397° C.) and KL (407° C.) cured PHMF, almost 100° C. higher than those cured with HMTA.

TABLE 5

Thermal stability and mechanical property

| Sample ID | $T_5$ | $T_{max}$ | $T_{50}$ | 700° C. wt | DMA Tg |
| --- | --- | --- | --- | --- | --- |
| PHMF + OL | 222 | 397 | 555 | 43.26 | 267 |
| PHMF + KL | 224 | 407 | 650 | 47.61 | 220 |
| PHMF + HMTA | 238 | 298 | 607 | 47.15 | 280 |

Further, the cured PHMF resins exhibited a sharp thermal decomposition stage between 250° C. and 500° C. This type of behaviour was also observed by Lee et al. in PF resins (Lee et al., 2003) and by Tejadoa in lignin substituted lignin-phenol-formaldehyde resins. (Tejado et al., 2007) The decomposition is believed to be pyrolytic degradation by random scission, which involves fragmentation of inter-unit linkages due to abundance of alkyl groups, releasing monomeric phenols into the vapour phase when degrading some other aromatic rings/oligomers. Since HMTA was decomposed into formaldehyde and ammonia upon heating, some hardened resin may be formed with small molecular weights after reactive sites have been consumed. These resins with smaller networks may break down at lower temperatures, compared with those resins cured with larger molecular weight OL. However, the latter resin may be result in low cross-linkage density because of the limited number of reactive sites in the OL structure, thus PHMF and HMTA system presents slightly higher residue at 700° C. Thus OL/KL has an overall comparable thermal stability with those cured with HMTA.

Downstream Products of the PHMF Resin

The glucose based PHMF resins were used as building blocks for the development of a thermosetting matrix for composites. Bio-composites based on natural components were prepared by open mold and hand layup impregnation of the fibres with the thermally polymerizable PHMF resin cured at a moderately high temperature.

Figure 11:
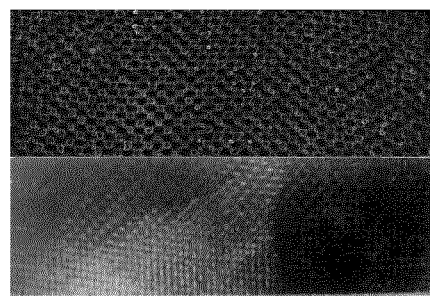
FIG. 11 are photographs of composite material made from PHMF resin reinforced with glass cloth and cured with OL (top panel), and HMTA (bottom panel)

FIG. 11 shows a bio-composite obtained by thermal cure of glass fibres impregnated with freshly prepared PHMF resin. The final content of natural originating material in the PHMF resin is more than 83%, reaching more than 41% in the composite loaded with 50% by weight of glass fibres.

Dynamic mechanical properties of PHMF-fiberglass composite was measured as a function of temperature. Besides the information on the glass transition temperature ($T_g$) value, other three important parameters can also be obtained for complete understanding of the viscoelastic behavior of the composite, i.e., storage modulus (E'), loss modulus (E") and tangent delta (tan δ), which are intercorrelated through the following expression:

$$\tan\delta = \frac{E''}{E'} \quad (1)$$

Figure 12:
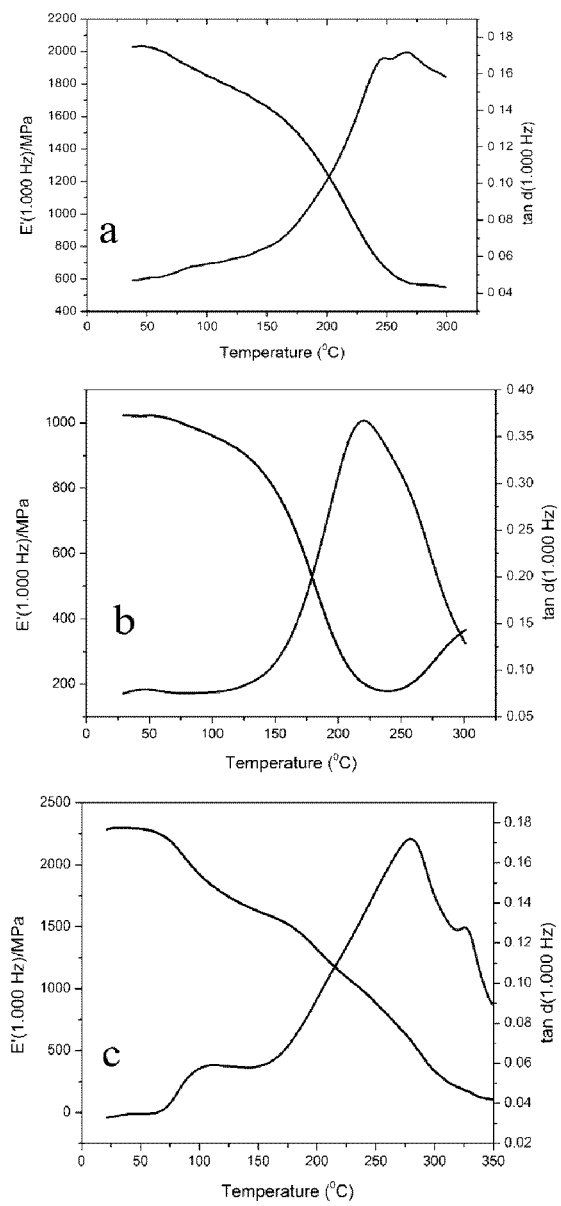
FIG. 12 shows DMA profiles of PHMF resin composite materials cured with (a) OL, (b) KL, and (c) HMTA: the storage modulus (E', trace starting in the upper right of each panel) and tan δ (trace starting in the lower left of each panel) are plotted against temperature.

The effects of OL/KL on the mechanical properties of the composite specimen were investigated and the DMA profiles are elucidated in FIG. 12, where the storage modulus (E') and tan δ are plotted against temperature. Storage modulus, representing the stiffness of cured resin, is proportional to the energy stored during a loading cycle. The $T_g$ of the cured samples in this work was determined by the peak temperature of tan δ. As we know, with the same curing agent and components, the different $T_g$ values of the thermosetting resins reflect the different architecture of monomers and crosslink density. The width of the tan δ peak reflects polymer network heterogenity with a broader peak insinuating a more heterogeneous polymer. By applying optimal amount of lignin or HMTA, the $T_g$ value was around 267° C. (OL) and 280° C. (HMTA). This implies that, compared with HMTA, the hydroxylmethylene group from lignin propose rigid bond with similarly steric restriction on the segment mobility in the network, and hence lead to close $T_g$. Although PHMF resin cured with KL presented inferior $T_g$ (220° C.), they are apparently ~130° C. higher than cardanol-formaldehyde phenolic resin. (da Silva Santos et al., 2010) Also, more work is still needed in order to improve the mechanical properties of the resin, at the same time improving its glass transition temperature and further lowering the curing temperature.

Figure 13:
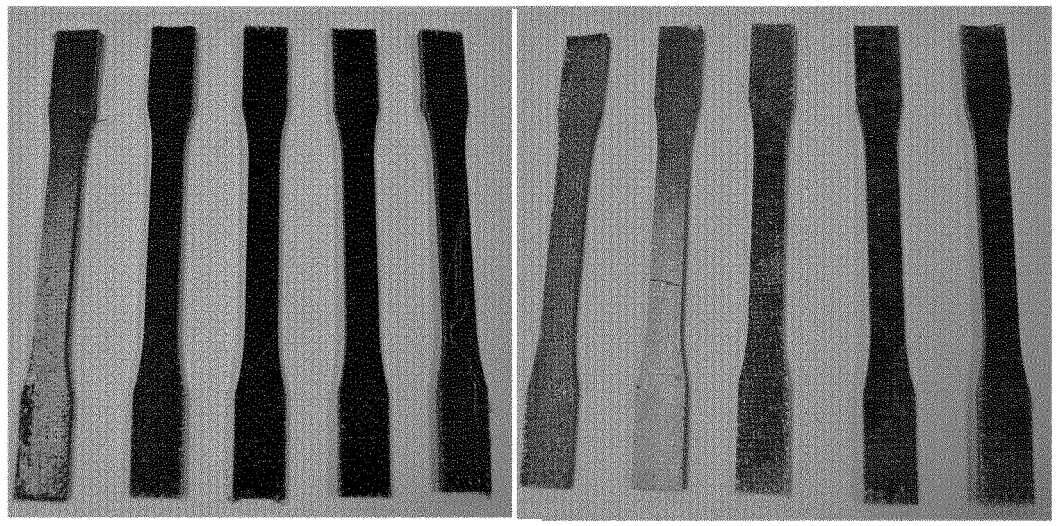
FIG. 13 are photographs of composite specimen used for tensile strength test as per ASTM 638, PHMF cured with HMTA (left panel) and PF novolac cured with HMTA (right panel)

Glass fiber reinforced composites were made from PHMF Resin as well as 15 wt % HMTA (mass ratio of glass fiber and resin+curing agent=1/1) under a curing procedure of 120° C. for 30 min, 150° C. for 30 min, and 180° C. for 1 h. Hot pressed composites were shaped into dog bone as ASTM 638, illustrated in FIG. 13. Table 6 compares the Tensile strength of the glass fiber-PHMF/PF composites. The glass fiber-PHMF composites are comparable to the glass fiber-PF composites, based on the tensile strength results.

TABLE 6

Mechanical property of PHMF/PF resins formed composites

| Sample | Tensile strength |
|---|---|
| PHMF + HMTA | 109.3 ± 4 MPa |
| PF + HMTA | 118 ± 1 MPa |

Mechanical Properties of the Fully Cured Glass Fiber Reinforced PHMF Resin Composites The effects of HMTA addition on the tensile properties of the fully cured glass fiber reinforced PHMF composites may be seen in Table 7. Experimental measurements showed markedly higher values for fracture strength (i.e., tensile strength) and failure strain as the HMTA content increased. For example, PHH10 (denoting PHMF resin matrix with HMTA at about 10 wt %) specimen has tensile strength values and elongation at break of 101 MPa and 4.85%, respectively. With increased HMTA addition, PHH15 and PHH20 specimens have higher tensile strength values of 109 and 114 MPa, respectively, suggesting that a higher HMTA addition creates more cross-linkage between the resin molecules. Compared with PHH10, PHH15 and PHH20 specimens also have a higher failure strain, being 5.55 and 6.9%, respectively. However, Young's modulus was found to decrease monotonically from 21 to 16 GPa with increased HMTA addition], implying that increasing the amount of curing agent decreases the stiffness of the composite materials.

TABLE 7

Tensile properties of the fully cured glass fiber reinforced PHMF resin composites

| | Elongation at break (%) | Tensile strength (MPa) | Young's modulus (GPa) | Extension (mm) |
|---|---|---|---|---|
| PHH10 | 4.9 ± 0.3 | 101.5 ± 4 | 20.9 ± 1 | 2.7 ± 0.1 |
| PHH15 | 5.6 ± 0.2 | 109.3 ± 4 | 19.7 ± 0.5 | 2.8 ± 0.1 |
| PHH20 | 6.9 ± 0.1 | 114.3 ± 2 | 16.5 ± 0.1 | 3.5 ± 0.1 |

Although the tensile fracture strengths of PHMF-based composites are not super high, but are still better than some PF-based composites or other type of resin-based composites. For example, glass/polyester composite presented the maximum tensile fracture strength of 70 MPa and modulus of 700 MPa. (Mouritz et al., 1997) Phenolic sheet moulding composite (SMC) has a tensile fracture strength of 96 MPa, (Pilato, 2010) and the tensile strength of the long glass fiber reinforced PF resin molding compounds is 115 MPa, which is very comparable with the values obtained here for the PHMF-based composites. George et al. reviewed natural fiber reinforced plastic composites, particularly with respect to their optimal mechanical performance, (George, Sreekala and Thomas, 2001) where these biocomposites have the maximum tensile strength of 35 MPa. Furthermore, the strengths of some composites are listed under the ASTM D638 standard test, e.g., glass-reinforced polyester and nylon, have 143 and 162 MPa tensile strength, respectively, which are not much higher than those of the PHH15 or PHH20 FRC produced here.

For 3-point bending tests of rectangular beam of the fully cured glass fiber reinforced PHMF and PF resin composites, the flexural modulus was calculated by Equation (2):

$$E = \frac{L^3 F}{4wh^3 d} \quad (2)$$

Flexural strength is defined by Equation (3):

$$\sigma = \frac{3FL}{2wh^2} \quad (3)$$

Where w(b) and h(d) are the width and height of the beam (mm), L is the length of the support span (mm), d is the deflection due to the load F applied at the fracture point (N).

TABLE 8

Flexural properties of the fully cured glass fiber reinforced PHMF resin composites

| | Peak Strain (%) | Maximum load (N) | Flexural modulus (Gpa) | Flexural strength (MPa) |
|---|---|---|---|---|
| PHH 10 | 4.7 ± 0.9 | 227.6 ± 19 | 8.7 ± 1 | 145.0 ± 9 |
| PHH15 | 6.3 ± 1 | 228.7 ± 8 | 6.5 ± 0.6 | 138.0 ± 8 |
| PHH20 | 7.2 ± 1 | 193.4 ± 8 | 2.5 ± 0.1 | 82.7 ± 3 |

It is evident from the 3-point bending tests results presented in Table 8 that increased HMTA addition resulted in a higher failure strain but a reduction in the maximum load from 227 N for PHH10 to 193 N for PHH20. Accordingly, increasing HMTA addition drastically decreased the bending modulus or flexural modulus from 8.7 GPa for PHH10 to 2.5 GPa for PHH20. This result could possibly be attributable to greater segmental mobility of the cross-linked network at a higher HMTA addition resulting in a higher crosslink density. In contrast, increased HMTA content resulted in a marked decline in flexural strength from 145 MPa for PHH10 to 82 MPa for PHH20. This result was expected, as a more highly crosslinked polymer (e.g. PHH20) would be expected to be more brittle. With a higher level of curing agent, excessive cross-linkage might be generated in the form of benzoxazine rings, leading to increased cross-linkage density and segment mobility for the cured composites, thus affecting the flexural properties. (Anseth et al., 1995; Zhu et al., 2004) The PHMF-based composites perform satisfactorily when compared to the flexural properties of other common industrial composite materials. For example, phenolic SMC was reported with 158 MPa flexural strength and 8.2 GPa flexural modulus, (Pilato, 2010) in the similar range of the values for PHH10. Natural fiber and glass fiber reinforced polymer composites that were studied for automotive applications have the flexural properties similar (less than 15% difference) to those of the PHMF-based composites. (Holbery and Houston, 2006) Glass fiber reinforced unsaturated polyesters presented 80 MPa flexural strength and 6.0 GPa modulus which is less or similar those of the PHMF-based composites.

Thermal Stability of the HMTA-Cured PHMF Resin

Figure 14:
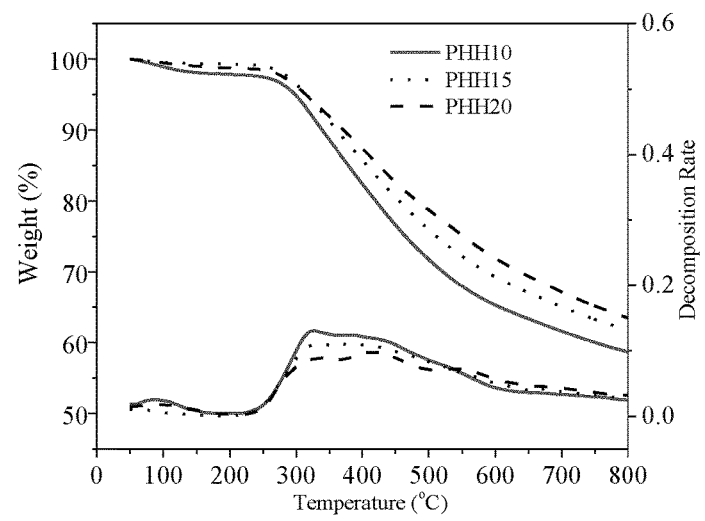
FIG. 14 shows TG and DTG profiles of the cured PHMF resins with various amounts of HMTA (10-20 wt %) in nitrogen atmosphere.

To examine the effect of HMTA addition on the thermal stability of cured PHMF novolac resins, TGA data under nitrogen and air atmosphere were collected and analyzed. FIG. 14 shows the weight loss and decomposition rate vs. temperature for PHMF resins cured with various amounts of HMTA (10-20 wt. %). The characteristic results from the TG/DTG profiles are summarized in Table 9.

In nitrogen atmosphere, the onset temperature $T_5$ (5% weight loss) increased from 297 to 315° C. when HMTA addition was increased from 10 to 15 wt. % and did not change at 20 wt. % HMTA. The improved thermal stability of PHMF with increased HMTA addition may be due to a greater crosslinking of the matrix, which may be inferred from the TG/DTG profiles in FIG. 14: the height of the decomposition rate (DTG) peak at about 320° C. decreases with increased HMTA addition. This peak may be due to the degradation of ether groups presented in the HMTA-cured PHMF systems. All of the resins exhibited a second decomposition peak at 455° C., which may correspond to aliphatic group degradation. Char yields at 800° C. obtained were as high as 59, 61 and 63% for PHH10, PHH15 and PHH20, respectively, which also suggests a higher crosslink density of the PHMF resin with increased HMTA addition, possibly due to increased formation of benzoxazine rings in the PHMF resin upon heating.

TABLE 9

Summary of the TG/DTG results for the cured PHMF resins with various amounts of HMTA (10-20 wt %) in nitrogen or air atmosphere

| Sample | Thermal stability in $N_2$ $T_5^a$ | | 1st DTG peak (° C.) | 2nd GTG peak (° C.) | Char yield at 800° C. (wt. %) | |
|---|---|---|---|---|---|---|
| | $N_2$ | Air | | | $N_2$ | Air |
| PHH10 | 297 | 313 | 315 | 452 | 59 | 0.77 |
| PHH15 | 315 | 316 | 315 | 452 | 61 | 0.42 |
| PHH20 | 315 | 310 | 327 | 455 | 63 | 0 |

$^a$Temperature at 5% weight loss

Figure 15:
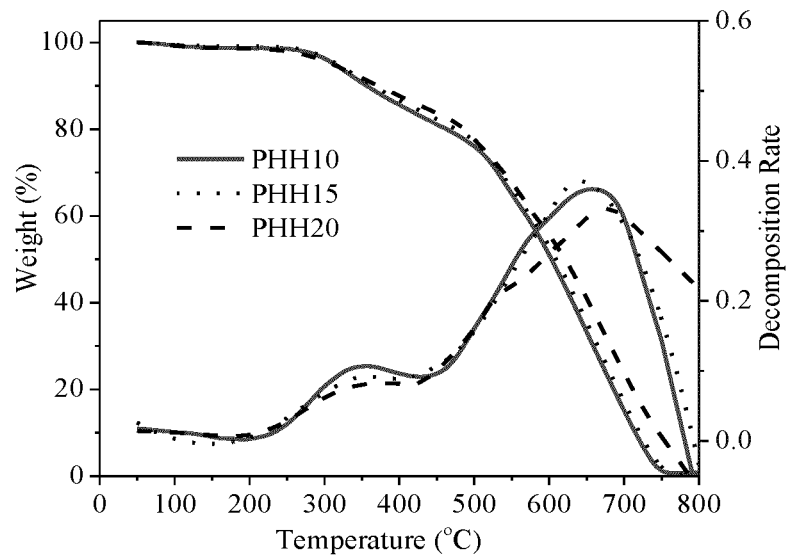
FIG. 15 shows TG and DTG profiles of the cured PHMF resins with various amounts of HMTA (10-20 wt %) in air atmosphere.

FIG. 15 features the weight loss and decomposition rate of PHH10, PHH15 and PHH20 in air. The characteristic results from the TG/DTG profiles are also summarized in Table 9. Generally the temperatures of the onset weight loss and maximum weight loss rate shifted to higher temperatures, and the degree of shift increased with increased HMTA addition. Similar observations have been reported in literature, where the high heat resistance was ascribed to the curing of intermediates into benzoxazine type structures. (Hatfield and Maciel, 1987) The $1^{st}$ and the $2^{nd}$ (dominant) decomposition temperatures of the HMTA-cured PHMF resins in air are ~350 and ~650° C., respectively, as compared to ~320 and 450° C., respectively in $N_2$. The most significant decomposition of the resin takes place at ~650° C., where aromatic structures are destroyed by combustion, and char is completely oxidized by 800° C.

Curing Behaviours of BPHMF Resins

Figure 16:
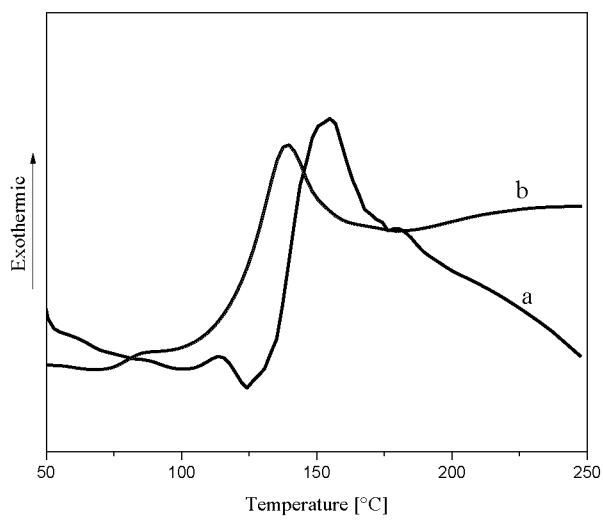
FIG. 16 shows DSC profile of BPHMF (a) and PHMF resins (b) cured with 15 wt % HMTA.

Since BPHMF resins contain very few reactive sites, additional curing agents such as epoxy resin, lignin and HMTA can be necessary to achieve cross-linking and curing of the resin. In addition, as the temperature increases, self-curing might also occur between lignin and resin as there are extra functional groups in lignin (such as hydroxymethylene groups and hydroxyl groups) that could contribute to cross-linking. A possible reaction might be the alkylation reaction between aromatic groups in resin and hydroxymethylene groups in lignin. FIG. 16 presents the DSC measurement result of the prepared BPHMF at a heating rate of 10° C./min in nitrogen in comparison with the PHMF resin, both using HMTA as the curing agent. DSC curves imply that the curing reaction for both resins starts at 120° C., peaks around 150° C. and ends after 200° C., which is a common phenomenon for many bio-phenolic resins. (Cheng et al., 2012; Cheng et al., 2013)

BPHMF needs a longer time than PHMF for completion of the curing process. This phenomenon may be explained by its low reactivity of the lignin-derived bio-phenols and the self-curing mechanism as explained before between the resin and lignin functional groups.

Thermal Stability

Figure 17:
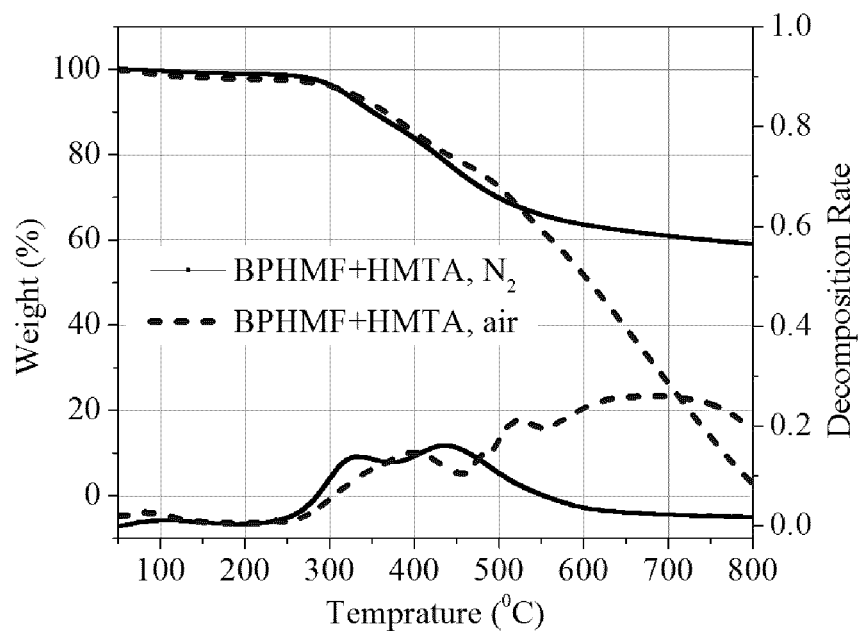
FIG. 17 shows thermal stability and decomposition rate of cured BPHMF resin in nitrogen (solid lines) and air (dotted lines) determined by TGA.

The synthesized BPHMF resin was also investigated using TGA-DTG for its thermal stability. As displayed in FIG. 17, the BPHMF resin started to decompose after 300° C. in either air or nitrogen atmosphere and this temperature is 50° C. higher than PHMF resin (the TGA results for PHMF are not shown here), suggesting that better thermal stability of BPHMF resin than that of PHMF resin. Table 10 shows comparison of thermal stability of BPHMF and PHMF resin upon being heated in nitrogen. The maximum decomposition temperature of BPHMF is higher than that of the PHMF by 60° C., implying significant enhancement of thermal resistance owing to the presence of the lignin-derived bio-phenols. Further, the BPHMF resin resulted in a higher carbon residue than PHMF resin, approx. 60 wt % at 800° C., almost 10% higher than that of the PHMF resin (Table 10). This might be due to the slower breakdown of ether linkages in lignin structures and its high aromatic fractions. Interestingly, the BPHMF resin displayed durable thermal stability in air, as represented by the higher weight residue (70-80%) at 500° C., above which the resin sharply decomposed in air.

TABLE 10

Comparison of thermal stability of BPHMF and PHMF resin upon being heated in nitrogen

| Sample | Maximum decomposition by DTG (° C.) | Residue left (%) | 5% Weight loss (° C.) | 10% Weight loss (° C.) | Residue at 800° C. (%) |
|---|---|---|---|---|---|
| BPHMF | 434 | 78 | 313 | 351 | 59 |
| PHMF | 394 | 82 | 323 | 358 | 51 |

Dynamic Mechanical Analysis

Figure 18A:
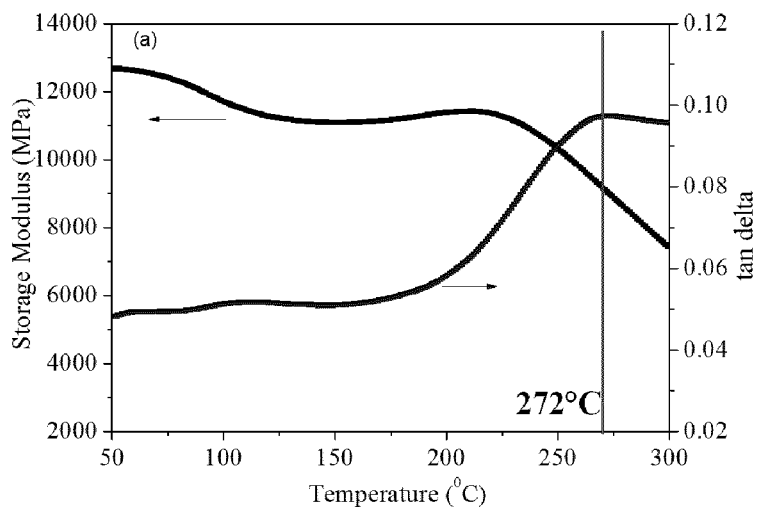
FIG. 18 show dynamic mechanic analysis of (a) BPHMF-fiberglass composite in comparison with (b) PHMF-fiberglass composite (b).
Figure 18B:
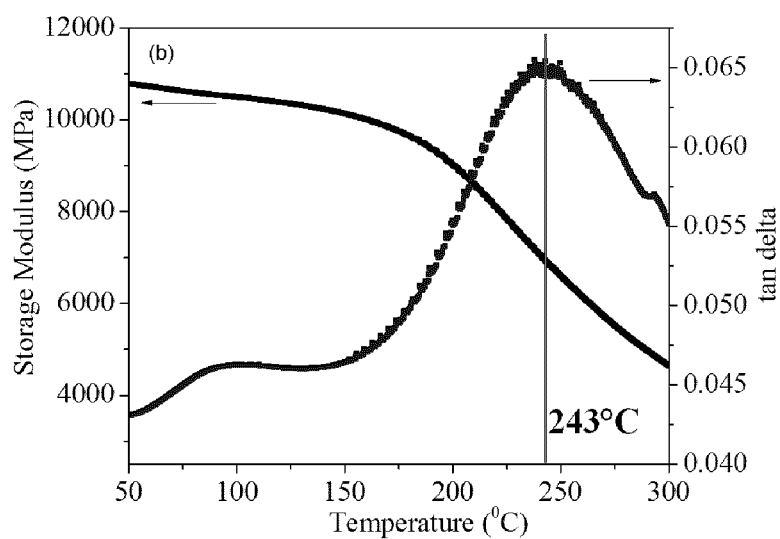

Dynamic mechanical properties of BPHMF-fiberglass composite was measured as a function of temperature. FIG. 18 shows dynamic mechanic analysis of BPHMF-fiberglass composite in comparison with PHMF-fiberglass composite. There is a generally decreasing trend in the value of storage modulus as the temperature increases. However, the storage modulus is not decreasing constantly over the entire temperature range, where a significant drop of its value occurs at 190-300° C., which corresponds to the glass transition temperature range of both BPHMF- and PHMF-fiberglass composites. Below 190° C., the temperature region is characterized by a glassy behavior where the stiffness of the material is of its highest value as compared with the remainder of the temperature regions. As shown in FIG. 18, there is a slight decrease in the storage modulus along with increasing temperature under 100° C. mainly due to the incomplete curing. The composites samples would undergo a transition from a glassy (highly stiff) region to a soft rubbery plateau region when the temperature increases beyond $T_g$.

Tan δ serves as a balance indicator between the elastic phase and viscous phase of a polymeric material. (Hassan et al, 2011) The damping peak obtained by loss tangent plot corresponds to the glass transition temperature $T_g$. Comparing between the damping peaks of the BPHMF-fiberglass composite (FIG. 18(a)) with the PHMF-fiberglass composite (FIG. 18(b)), the incorporation of DHL into the polymer matrix (BPHMF) led to an increase in its glass transition temperature $T_g$ (272° C.), when compared with that of the PHMF polymer matrix (243° C.).

Mechanical Properties of Fiberglass Reinforced Plastics Using BPHMF Resin Fully Cured with HMTA Table 11 gives the comparison of the tensile strengths of woven fiberglass cloth-PHMF resin FRC composites compared with that of the BPHMF FRC, both cured with HMTA at 15 wt %. The BPHMF composites have tensile strength of around 89 MPa, with a 20% inferior to that of PHMF composite, but both values are actually comparable to tensile strength of commercial phenolic FRC.

TABLE 11

Tensile strengths of BPHMF and PHMF FRC cured with HMTA

| Sample | Tensile strength |
| --- | --- |
| BPHMF + HMTA | 89 ± 1 MPa |
| PHMF + HMTA | 109 ± 4 MPa |

The invention thus provides formaldehyde-free bio-phenol HMF resins (BPHMF) obtained through reacting phenolated de-polymerized hydrolysis lignin with HMF in situ-derived from glucose in the presence of catalysts. Gross yield of BPHMF resin can be 85% by weight. Structure analysis by FTIR showed that the resinification was successful and the molecular weights (weight-average weight) of BPHMF resins obtained were around 9030 g/mol, compared with an Mw of 2107 g/mol for the PDHL, indicating substantial poly-condensation PDHL with HMF during the synthesis. BPHMF only has a molecular weight of 2800 g/mol. The BPHMF resin cured with HMTA was found to be thermally stable up to 300° C. in either nitrogen or air. Compared with PHMF resins, the BPHMF resin needs a higher temperature for curing, but it has larger storage modulus and $T_g$, thus it has better thermomechanical properties.

Glass fiber reinforced PHMF resin cured with differing amounts of HMTA curing agent (about 10 to 20 wt. %) were subjected to thermal, physical and mechanical analyses. Generally, the tensile properties of the composites, thermal stability, storage modulus, crosslink density and glass transition temperature, were found to be enhanced by increasing the amount of HMTA. However, the flexural properties, rheological and chemical resistance tests suggest that 15 wt. % HMTA may be just sufficient to form a saturated three dimensional cross-link in the novolac resin. Use of too much HMTA can form unstable end groups derived from HMTA, which decreases the overall chemical resistance of the resin and attenuates the solidification process. The results demonstrate the feasibility of using PHMF resin for incorporation as a polymer matrix as part of fiber reinforced composites. Formaldehyde-free products can be obtained even when HMTA is used as a curing agent.

EXPERIMENTAL

Materials

Reagent grade phenol (99.0%), $CrCl_2$ (95.0%), $CrCl_3.6H_2O$ (98.0%), D-glucose (99.5%), tetraethyl ammonium chloride hydrate (99.0%), and 5-hydroxymethyl furfural (99.0%) were obtained from Sigma-Aldrich. Tetrahydrofuran (THF, HPLC grade), dimethyl sulfoxide (DMSO-d6), and 0.005 M $H_2SO_4$ HPLC grade water were obtained from Caledon Laboratories or Fisher Scientific. The organosolv lignin used as a curing agent was supplied by Lignol Canada. All reagents were used as is without further treatment/purification.

Formaldehyde (ca 37%) is from Anachemia, Montreal, QC, and used as received. Hydrolysis lignin was supplied by FPInnovations, a byproduct from its hardwood fractionation process for bioproducts (or called "TMP-bio process"). (Yuan et al., 2011) The HL contains >50-60 wt % lignin balanced by residual cellulose and carbohydrates. The molecular weight was believed >20,000 g/mol, but not measureable due to its insolubility in a solvent. The solvents used in this work were distilled water, acetone (Fisher Scientific, Fair Lawn, N.J.), and a sodium hydroxide solution (ca 50%, Ricca Chemical Co., Arlington, Tex.), all used as received.

Hexamethylenetetramine (HMTA) was obtained from Sigma-Aldrich and was used as a curing agent for the BPHMF resins. BGF fiberglass cloth was purchased from Freeman, Ohio.

The de-polymerized hydrolysis lignin (DHL) was obtained using a de-polymerization process subject of a separate patent application, operating in a solvent at 150-300° C. for 30-120 min under low operating pressure (<150 psi). The process resulted in a moderately high yield of de-polymerized HL (DHL)(70 wt %) with a SR of ~10 wt %. The process was found to be very cost-effective and highly efficient for the depolymerization/liquefaction of HL of a very high molecular weight ($M_w$>20,000 g/mole) into DHL with a much lower molecular weight (1000-2000 g/mol). However, it is not critical for the de-polymerization process for this invention, as any de-polymerized/liquefied lignin with weight average molecular weight <5000 g/mol can be used as a bio-phenol for the production of BPHMF resins.

The phenolated DHL (PDHL) was prepared in this work by treating equal amount of DHL and phenol as well as 2% of sulfuric acid and solvent acetone in an autoclave reactor, heated to 120° C. for 3 h, followed by quenching the reactor to room temperature. The solvent was removed by rotary evaporation and vacuum drying.

Synthesis of PHMF Resins

The synthesis of phenol-HMF (PHMF) resin was first performed at atmospheric pressure in a 100 mL three-neck reactor equipped with a condenser and nitrogen outlet in the middle neck, a nitrogen inlet and a thermometer in two side necks respectively. In a typical run, the reactor was purged with nitrogen, then 9.41 g (0.100 mol) phenol, 16.20 g (0.090 mol) glucose, 0.0610 g $CrCl_2$ (about 0.02 M in reaction mixture), 0.0570 g $CrCl_3.6H_2O$ (0.01 M), and 0.1640 g (0.06 M) tetraethyl ammonium chloride (TEAC) were added subsequently. The reactor was immersed in an oil bath preheated to 120° C. and stirred with a magnetic stirrer under nitrogen atmosphere for 3 hours. For comparison, PHMF resin was also synthesized using reagent grade HMF at a HMF/phenol ratio of 1:0.9 under conditions similar to those described above. Resins synthesis at higher glucose to phenol ratios, was conducted in a 100 mL ACE glass pressure reactor. Typically, 7.05 g phenol (0.075 mol), 27.0 g (0.15 mol) glucose, 6.00 g water, and 0.100 g $CrCl_2$ (0.02 M), 0.0940 g $CrCl_3.6H_2O$ (0.01 M), and 0.300 g (0.06 M) TEAC were added to the reactor. The reactor was evacuated and purged with nitrogen through a rubber septum, then capped with a Teflon stopper. The reactor was placed into an oil bath preheated to 120° C. and stirred with a magnetic stirrer for 5 hours. After cooling, the reaction mixture was diluted with 80/20 (v/v) methanol/water to form a uniform solution. Samples of this solution were then taken and further diluted with HPLC solvent for glucose, phenol, and HMF analysis. The product was purified (to remove unreacted glucose and phenol) by first removing the solvent using a rotary evaporator, then dissolving the remaining material in acetone, and precipitating PHMF in 90/10 (v/v) water/methanol. After vacuum drying, the precipitation process resulted in a semi-solid black PHMF product. The molecular weight, structure, and curing properties the the PHMF product were characterized by GPC, FTIR, NMR, and DSC. The instruments and analytical conditions are provided in supplementary information.

Curing process: OL/KL cured PHMF resin was prepared via alkylation reaction by adding designed amount of OL/KL to the bulk resin with heating at 120° C. for 1 hour, 150° C. for 1 hour, and subsequent post-curing at 180° C. for 1 hour. Prior to polymerization, the resin and curing agents were dissolved in acetone to form a homogeneous admixture and acetone was removed. As comparison, PHMF was cured with 15 wt % HMTA, according to common amount in publications. (Mwaikambo and Ansell, 2001)

Synthesis of BPHMF Resin

Phenolated DHLs were used as raw material to synthesize BPHMF resins. As a typical example, herewith the procedure for synthesis of BPHMF with 50% phenol substitution level is presented here. In a typical synthesis run for BPHMF resin, 14.10 g phenolated DHL (containing 50 wt % phenol and 50 wt % DHL), 13.5 g (0.075 mol) glucose, and 3 g water and a total of 0.3 g catalysts (same catalysts as were used for PHMF resin synthesis) were loaded into a 100 mL glass pressure reactor capped with a Teflon stopper. The reactor was put into a preheated 120° C. oil bath and stirred with a magnetic stirrer. Temperature was strictly controlled in the process since the reaction is sensitive to temperature. Therefore, by-products could be reduced by maintaining the temperature at the desired level. After reaction for 8 hours, the reaction was stopped by quenching to room temperature in a water bath. The products were dried by rotary evaporation and vacuum drying. GC-MS tests were conducted on the resulting BPHMF resin in order to calculate phenol conversion into resin. The phenol conversion was determined to be approx. 60%, and the unconverted free phenol was recovered by steam distillation in this work (however, in practice, recovering unreacted phenol is not needed as the unreacted phenol can be cured with the curing agent at the resin's curing stage). Moreover, phenol conversion can be further improved by increasing glucose addition in the resinification process.

Feedstock and Product Characterization

The chemical/thermal/mechanical properties of the feedstock and products produced were characterized using various techniques, including gel permeation chromatography (GPC), Fourier transform infrared spectroscopy (FTIR), gas chromatography-mass spectrometry (GC-MS), differential scanning calorimeter (DSC), thermogravimetric analysis (TGA) and dynamic mechanical analysis (DMA).

The FTIR spectra were obtained with a Nicolet 6700 Fourier Transform Infrared Spectroscopy with smart ITR/ATR accessory, scanning from 500 to 4000 cm$^{-1}$.

$^1$H NMR and $^{13}$C NMR (nuclear magnetic resonance) spectra were acquired by using a Varian Inova 600 NMR (16-32 scans at 298K) spectrometer equipped with a Varian 5 mm triple-resonance indirect-detection HCX probe. A 2 s recycle delay, 3.6 s acquisition time, a 45-degree tip angle (pw=4.8 us), and a spectral width from 0 ppm to 14 ppm (sw=9000.9 Hz) were used. $d_6$-DMSO was selected as the solvent of liquid sample and fine power for solid-state $^{13}$C cross-polarization magic-angle spinning (CPMAS).

HPLC (high performance liquid chromatography) analysis was conducted with Waters Breeze instrument (1525 binary pump with refractive index and ultraviolet detector). Glucose, phenol, and HMF contents were analyzed by using Bio-Rad Aminex HPX-87H column and HPLC grade 0.005 M $H_2SO_4$ water as the mobile phase (flow rate of 0.6 mL/min).

Molecular weights were measured on a Waters Styrylgel HR1 gel permeation chromatography (GPC, 1525 binary pump, UV detector set at 270 nm, Waters Styragel HR1 column at 40° C.) using THF as the eluent at a flow rate of 1 mUmin, using linear polystyrene standards for calibration.

The thermal curing properties of the resins were evaluated with a differential scanning calorimetry (DSC, Mettler-Toledo, Switzerland) under 50 mL/min $N_2$ at heating rate of 10° C./min between 40 and 250° C. in an aluminum crucible.

Thermo-gravimetric behavior of the uncured and cured PHMF resin was measured using a TGA 2050 (Thermogravimetric Analyzer, TA Instruments). Approximately 10 mg of sample was placed in a platinum pan and heated to 700° C. at 10° C./min in a $N_2$ atmosphere of 50 mL min$^{-1}$.

Thermo-mechanical properties of the cured composites were measured using dynamic mechanical analysis (DMA). Rectangular samples with approximate dimensions of 20×10×1 mm$^3$ were tested using a Netzsch 242C DMA in three point bending geometry. The samples were tested at a driving frequency of 1 Hz with a deflection of 5 μm while ramping the temperature from 30 to 250° C. at a scanning rate of 5° C. min$^{-1}$.

As an example, the following details the procedure for characterizing the feedstock and products for the BPHMF resins. The molecular weights distribution profiles of DHL before and after phenolation as well as the BPHMF resin were measured by gel permeation chromatography (GPC, Waters Styrylgel HR1) using THF as the eluent and linear polystyrene as standards for calibration. The functional group structure of the BPHMF resin was analyzed using FTIR (Perkin-Elmer Spectrum Two IR Spectrometers). As mentioned previously, the remaining free phenol concentration in the resins was detected by GC-MS on an Agilent 7890B GC coupled with a 5977A MSD using a 30 m×0.5 mm×0.25 μm DB-5 column with temperature program as follows: a 1 min hold at an initial temperature of 50° C. followed by a 30° C. min$^{-1}$ ramp to a final temperature of 280° C. with 1 min hold. The thermal curing properties of the resins were evaluated with a differential scanning calorimetry (DSC, Mettler-Toledo, Schwerzenbach, Switzerland) under 50 ml/min $N_2$ at a ramp rate of 10° C./min between 50° C. and 250° C. in a sealed aluminum crucible. The thermal stability of the BPHMF resins was examined by thermogravimetric analysis (TGA) with 5-10 mg thermally pre-cured resins (120° C. for 30 min, 150° C. for 30 min, and 180° C. for 1 h) on a Perkin-Elmer thermal analysis system with Pyris 1 TGA unit. The samples were measured in nitrogen at a flow rate of 20 ml/min; the ramp rate was 10° C./min. The dynamic mechanical properties (such as glass transition temperature, $T_g$) of the cured BPHMF composites were characterized using dynamic mechanical analyzer (DMA Q800, TA Instruments) at 5° C./min. Composites were prepared by applying homogeneous solution of BPHMF and HMTA onto glass fibre at 1/1 ratio (w/w) and keeping at room temperature until solvent was away. The sample was cured by hot pressing in a Carver hydraulic hot press at same procedure as resin curing under the load of 35 MPa (5000 psi).

Development of Composites

Mixtures of the HMTA and PHMF (or BPHMF) novolac matrix were prepared by dissolving the ingredients in a mixture of 90% acetone and 10% water (v/v) at 50° C. Three formulations were produced with PHMF resin (PH) and HMTA (H) weight ratios of 100:10 (PHH10), 100:15 (PHH15), and 100:20 (PHH20). The resin mixture was applied to the glass fiber at a 1:1 ratio by weight and was kept at room temperature for 24 h to allow the solvent to evaporate. The dried resin was cured by hot pressing in a Carver hydraulic hot press at 120° C. for 30 min, 150° C. for an additional 30 min, and then at 180° C. for a further 60 min under gradually increasing load up to 35 MPa (5000 psi). Upon annealing at 180° C. for 5 h, the fully cured composite plates were cut into samples as required by the ASTM standards. Given the unavoidable loss of the resin during the hot-pressing process, the fully cured composite contained approx. 40% of resin, as confirmed by burning the composite in a muffle furnace. For comparison, a conventional PF cured with HMTA and glass fiber reinforced PF composite were prepared as described above. The weight ratio of the PF resin (PF) and HMTA (H) was 100:15 (PFH15).

Mechanical Properties Tests

The tensile properties were measured using an Admet 7000 Universal Testing Machine in accordance with ASTM D 638. Dumbbell specimens with length of 180 mm and width of grip section of 10 mm were used. Crosshead speed was 10 mm per min and total extension range was 25 mm. Tensile stress was applied until the failure of the sample and the maximum applied stress prior to failure was recorded as the tensile strength. Stress-strain relationship was obtained and its slope determined Young's modulus. Five duplicates were made for each test.

The flexural modulus and flexural strength of the composite specimens were determined following ASTM D790-M93 using the same universal testing machine. The rectangular specimens in the dimension of 127 mm×13 mm×3 mm were performed on a three-point bending apparatus with a support span of 50 mm and loaded at the crosshead speed of 1.2 mm/min to the center of each specimen until failure. The flexural modulus and flexural fracture strength were noted as the maximum applied stress prior to failure and flexural modulus was obtained as the slope of load-displacement curve.

REFERENCES

Alonso, M. V., Oliet, M., Pérez, J. M., Rodriguez, F., Echeverria, J., 2004. Determination of curing kinetic parameters of lignin-phenol-formaldehyde resol resins by several dynamic differential scanning calorimetry methods, Thermochim. Acta. 419, 161-167.

Alonso, M. V., Oliet, M., Rodriguez, F., Garcia, J., Gilarranz, M., Rodriguez, J., 2005. Modification of ammonium lignosulfonate by phenolation for use in phenolic resins, Bioresour. Technol. 96, 1013-1018.

Anseth, K. S., Kline, L. M., Walker, T. A., Anderson, K. J., Bowman, C. N., 1995. Reaction kinetics and volume relaxation during polymerizations of multiethylene glycol dimethacrylates, Macromolecules. 28, 2491-2499.

Binder, J. B., Raines, R. T., 2009. Simple chemical transformation of lignocellulosic biomass into furans for fuels and chemicals, J. Am. Chem. Soc. 131, 1979-1985.

Bryson, R. L., Hatfield, G. R., Early, T. A., Palmer, A. R., Maciel, G. E., 1983. Carbon-13 NMR studies of solid phenolic resins using cross polarization and magic-angle spinning, Macromolecules. 16, 1669-1672.

Cai, S. X., Lin, C. H., 2005. Flame-retardant epoxy resins with high glass-transition temperatures from a novel trifunctional curing agent: Dopotriol, Journal of Polymer Science Part A: Polymer Chemistry. 43, 2862-2873.

Cheng, S., Wilks, C., Yuan, Z., Leitch, M., Xu, C. C., 2012. Hydrothermal degradation of alkali lignin to bio-phenolic compounds in sub/supercritical ethanol and water-ethanol co-solvent, Polym. Degrad. Stab. 97, 839-848.

Cheng, S., Yuan, Z., Leitchb, M., Anderson, M., Xu, C. C., 2013. Highly efficient de-polymerization of organosolv lignin using a catalytic hydrothermal process and production of phenolic resins/adhesives with the depolymerized lignin as a substitute for phenol at a high substitution ratio, Ind. Crop. Prod. 44, 315-322.

da Silva Santos, R., de Souza, A. A., De Paoli, M., de Souza, Cleide Maria Leite, 2010. Cardanol-formaldehyde thermoset composites reinforced with buriti fibers: Preparation and characterization, Composites Part A: Applied Science and Manufacturing. 41, 1123-1129.

De Medeiros, E. S., Agnelli, J. A. M., Joseph, K., De Carvalho, L. H., Mattoso, L. H. C., 2003. Curing behavior of a novolac-type phenolic resin analyzed by differential scanning calorimetry, J Appl Polym Sci. 90, 1678-1682.

Dee, S. J., Bell, A. T., 2011. A Study of the Acid-Catalyzed Hydrolysis of Cellulose Dissolved in Ionic Liquids and the Factors Influencing the Dehydration of Glucose and the Formation of Humins, ChemSusChem. 4, 1166-1173.

Dizhbite, T., Zakis, G., Kizima, A., Lazareva, E., Rossinskaya, G., Jurkjane, V., Telysheva, G., Viesturs, U., 1999. Lignin—a useful bioresource for the production of sorption-active materials, Bioresour. Technol. 67, 221-228.

Effendi, A., Gerhauser, H., Bridgwater, A. V., 2008. Production of renewable phenolic resins by thermochemical conversion of biomass: A review, Renewable and Sustainable Energy Reviews. 12, 2092-2116.

Elavarasan, P., Kondamudi, K., Upadhyayula, S., 2011. Kinetics of phenol alkylation with tert-butyl alcohol using sulfonic acid functional ionic liquid catalysts, Chem. Eng. J. 166, 340-347.

Fadel, A., Yefsah, R., Salaun, J., 1987. Anhydrous ferric chloride dispersed on silica gel. IV [1-3]: A catalyst for alkylation of aromatic compounds in dry medium, Reactive Polymers, Ion Exchangers, Sorbents. 6, 93-97.

Ferhan, M., Yan, N., Sain, M., 2013. A New Method for Demethylation of Lignin from Woody Biomass using Biophysical Methods, J. Chem. Eng. Process. Technol. 4, 160.

George, J., Sreekala, M. S., Thomas, S., 2001. A review on interface modification and characterization of natural fiber reinforced plastic composites, Polym. Eng. Sci. 41, 1471-1485.

Girisuta, B., Janssen, L., Heeres, H., 2006. Green chemicals: A kinetic study on the conversion of glucose to levulinic acid, Chem. Eng. Res. Design. 84, 339-349.

Grenier-Loustalot, M. F., Larroque, S., Grenier, P., Bedel, D., 1996. Phenolic resins: 4. Self-condensation of methylolphenols in formaldehyde-free media, Polymer. 37, 955-964.

Hahnenstein, I., Hasse, H., Kreiter, C. G., Maurer, G., 1994. $^1$H- and $^{13}$C-NMR-Spectroscopic Study of Chemical Equilibria in Solutions of Formaldehyde in Water, Deuterium Oxide, and Methanol, Ind Eng Chem Res. 33, 1022-1029.

Hassan, A., Rahman, N. A., Yahya, R., 2011. Extrusion and injection-molding of glass fiber/MAPP/polypropylene: effect of coupling agent on DSC, DMA and mechanical properties, J. Reinf. Plast. Compos. 30, 1223-1232.

Hatfield, G. R., Maciel, G. E., 1987. Solid-state NMR study of the hexamethylenetetramine curing of phenolic resins, Macromolecules. 20, 608-615.

Holbery, J., Houston, D., 2006. Natural-fiber-reinforced polymer composites in automotive applications, JOM. 58, 80-86.

Hu, X., Lievens, C., Larcher, A., Li, C., 2011. Reaction pathways of glucose during esterification: Effects of reaction parameters on the formation of humin type polymers, Bioresour. Technol. 102, 10104-10113.

Huber, G. W., Iborra, S., Corma, A., 2006. Synthesis of transportation fuels from biomass: chemistry, catalysts, and engineering, Chem. Rev. 106, 4044-4098.

Jin, Y., Cheng, X., Zheng, Z., 2010. Preparation and characterization of phenol-formaldehyde adhesives modified with enzymatic hydrolysis lignin, Bioresour. Technol. 101, 2046-2048.

Knop, A., Pilato, L. A., 1985. Phenolic resins: chemistry, applications, and performance: future directions. Springer-Verlag Berlin.

Kowatsch, S., 2010. Formaldehyde, Anonymous Springer, pp. 25-40.

Kurple, K. R., 1989. Foundry resins.

Lee, Y. K., Kim, D. J., Kim, H. J., Hwang, T. S., Rafailovich, M., Sokolov, J., 2003. Activation energy and curing behavior of resol- and novolac-type phenolic resins by differential scanning calorimetry and thermogravimetric analysis, J Appl Polym Sci. 89, 2589-2596.

Li, C., Zhang, Z., Zhao, Z. K., 2009. Direct conversion of glucose and cellulose to 5-hydroxymethylfurfural in ionic liquid under microwave irradiation, Tetrahedron Lett. 50, 5403-5405.

Lim, A. S. C., Solomon, D. H., Zhang, X., 1999. Chemistry of novolac resins. X. Polymerization studies of HMTA and strategically synthesized model compounds, J. Appl. Polym. Sci. 37, 1347-1355.

Long, D. H., Zhang, J., Yang, J. H., Hu, Z. J., Li, T. Q., Cheng, G., Zhang, R., Ling, L. C., 2008. Preparation and microstructure control of carbon aerogels produced using m-cresol mediated sol-gel polymerization of phenol and furfural, New Carbon Materials. 23, 165-170.

Lytle, C., Bertsch, W., McKinley, M., 1998. Determination of novolac resin thermal decomposition products by pyrolysis-gas chromatography-mass spectrometry, J. Anal. Appl. Pyrolysis. 45, 121-131.

Markovic, S., Dunjic, B., Zlatanic, A., Djonlagic, J., 2001. Dynamic mechanical analysis study of the curing of phenol-formaldehyde novolac resins, J. Appl. Polym. Sci. 81, 1902-1913.

Moubarik, A., Pizzi, A., Allal, A., Charrier, F., Charrier, B., 2009. Cornstarch and tannin in phenol-formaldehyde resins for plywood production, Industrial Crops and Products. 30, 188-193.

Mouritz, A. P., Leong, K. H., Herszberg, I., 1997. A review of the effect of stitching on the in-plane mechanical properties of fibre-reinforced polymer composites, Compos. Part A-Appl. S. 28, 979-991.

Mwaikambo, L., Ansell, M., 2001. Cure characteristics of alkali catalysed cashew nut shell liquid-formaldehyde resin, J. Mater. Sci. 36, 3693-3698.

Netravali, A. N., Chabba, S., 2003. Composites get greener, Materials today. 6, 22-29.

Nielsen, A. T., Moore, D. W., Ogan, M. D., Atkins, R. L., 1979. Structure and chemistry of the aldehyde ammonias. 3. Formaldehyde-ammonia reaction. 1, 3, 5-Hexahydrotriazine, J. Org. Chem. 44, 1678-1684.

Ottenbourgs, B., Adriaensens, P., Carleer, R., Vanderzande, D., Gelan, J., 1998. Quantitative carbon-13 solid-state nmr and FT-Raman spectroscopy in novolac resins, Polymer. 39, 5293-5300.

Ottenbourgs, B. T., Adriaensens, P. J., Reekmans, B. J., Carleer, R. A., Vanderzande, D. J., Gelan, J. M., 1995. Development and optimization of fast quantitative carbon-13 NMR characterization methods of novolac resins, Ind. Eng. Chem. Res. 34, 1364-1370.

Pérez, J., Rodriguez, F., Alonso, M., Oliet, M., 2011. Time-temperature-transformation cure diagrams of phenol-formaldehyde and lignin-phenol-formaldehyde novolac resins, J Appl Polym Sci. 119, 2275-2282.

Pilato, L., 2010. Phenolic resins: A century of progress. Springer Verlag.

Richmond, H., Myers, G., Wright, G. F., 1948. The Reaction between Formaldehyde and Ammonia, J. Am. Chem. Soc. 70, 3659-3664.

Sarkanen, S., Teller, D. C., Hall, J., McCarthy, J. L., 1981. Lignin. 18. Associative effects among organosolv lignin components, Macromolecules. 14, 426-434.

Sergeev, V., Shitikov, V., Nechaev, A., Chizhova, N., KUDRYAVSTEVA, N., 1995. Hydroxymethyl derivatives of phenols as curing agents for novolacs, Polymer science. Series B. 37, 273-276.

Shibata, S., Cao, Y., Fukumoto, I., 2008. Flexural modulus of the unidirectional and random composites made from biodegradable resin and bamboo and kenaf fibres, Compos. Part A-Appl. S. 39, 640-646.

Simitzis, J., Karagiannis, K., Zoumpoulakis, L., 1996. Influence of biomass on the curing of novolac-composites, European polymer journal. 32, 857-863.

Suharty, N. S., Wirjosentono, B., Firdaus, M., Handayani, D. S., Sholikhah, J., Maharani, Y. A., 2008. Synthesis of degradable bio-composites based on recycle polypropylene filled with bamboo powder using a reactive process, J. Physi. Sci. 19, 105-115.

Tejado, A., Pena, C., Labidi, J., Echeverria, J., Mondragon, I., 2007. Physico-chemical characterization of lignins from different sources for use in phenol-formaldehyde resin synthesis, Bioresour. Technol. 98, 1655-1663.

Wu, D., Fu, R., 2006. Synthesis of organic and carbon aerogels from phenol-furfural by two-step polymerization, Microporous and mesoporous materials. 96, 115-120.

Wan, J., Wang, S., Li, C., Zhou, D., Chen, J., Liu, Z., Yu, L., Fan, H., Li, B. G., 2011. Effect of molecular weight and molecular weight distribution on cure reaction of novolac with hexamethylenetetramine and properties of related composites, Thermochim. Acta. 530, 32-41.

Wang, M., Leitch, M., Xu, C., 2009. Synthesis of phenol-formaldehyde resol resins using organosolv pine lignins, Eur. Polym. J. 45, 3380-3388.

Yan, H., Yang, Y., Tong, D., Xiang, X., Hu, C., 2009. Catalytic conversion of glucose to 5-hydroxymethylfurfural over $SO_4^{2-}/ZrO_2$ and $SO_4^{2-}/ZrO^{2-}Al_2O_3$ solid acid catalysts, Catalysis Communications. 10, 1558-1563.

Yuan, Z., Browne, T. C., Zhang, X., 2011. Biomass fractionation process for bioproducts, US Patent. US20110143411 A1.

Yuan, Z., Xu, C. C., Cheng, S., Leitch, M., 2011. Catalytic conversion of glucose to 5-hydroxymethyl furfural using inexpensive co-catalysts and solvents, Carbohydr. Res. 346, 2019-2023.

Yuan, Z., Zhang, Y., Xu, C., 2014. Synthesis and Thermo-mechanical Property Study of Novolac Phenol-Hydroxymethyl Furfural (PHMF) Resin, RSC Adv. 4, 31829-31835.

Zakzeski, J., Bruijnincx, P. C. A., Jongerius, A. L., Weckhuysen, B. M., 2010. The catalytic valorization of lignin for the production of renewable chemicals, Chem. Rev. 110, 3552.

Zhang, L., Steinmaus, C., Eastmond, D. A., Xin, X. K., Smith, M. T., 2009. Formaldehyde exposure and leukemia: a new meta-analysis and potential mechanisms, Mutation Research/Reviews in Mutation Research. 681, 150-168.

Zhang, X., Potter, A. C., Solomon, D. H., 1998. The chemistry of novolac resins: Part 7. Reactions of para-hydroxybenzylamineintermediates, Polymer. 39, 1957-1966.

Zhang, X., Looney, M. G., Solomon, D. H., Whittaker, A. K., 1997. The chemistry of novolac resins: 3. $^{13}$C and $^{15}$N n.m.r. studies of curing with hexamethylenetetramine, Polymer. 38, 5835-5848.

Zhao, H., Holladay, J. E., Brown, H., Zhang, Z. C., 2007. Metal chlorides in ionic liquid solvents convert sugars to 5-hydroxymethylfurfural, Science. 316, 1597-1600.

Zhu, J., Chandrashekhara, K., Flanigan, V., Kapila, S., 2004. Curing and mechanical characterization of a soy-based epoxy resin system, J. Appl. Polym. Sci. 91, 3513-3518.

The invention claimed is:

1. A method for preparing a cross-linkable viscous liquid phenol-HMF resin, the method comprising the step of:
converting a hexose to 5-hydroxymethyl furfural (HMF) in the presence of a phenolic compound, a bifunctional Lewis acid catalyst and an ionic liquid, wherein the bifunctional Lewis acid catalyst
catalyzes dehydration of hexose to HMF; and
promotes in-situ formation of covalent bonds between a carbon atom of the aromatic ring of the phenolic compound and the carbon of the formyl group of the HMF to form the viscous liquid phenol-HMF resin, wherein the resin has a weight average molecular weight ($M_w$) in the range of about 500 to about 5000 g/mol.

2. The method of claim 1, wherein the bifunctional Lewis acid catalyst comprises a Friedel-Crafts alkylation catalyst.

3. The method of claim 2, wherein the bifunctional Lewis acid catalyst comprises a mixture of $YCl_2$, $YCl_3$ and quaternary ammonium salt, wherein Y is Cr or Cu.

4. The method of claim 3, wherein the quaternary ammonium salt is tetraethylammonium chloride (TEAC) or tetramethylammonium chloride.

5. The method of claim 1, wherein the hexose comprises glucose.

6. The method of claim 1, wherein said phenolic compound is selected from unsubstituted phenol, cardanol and combinations thereof.

7. The method of claim 1, wherein the phenolic compound is obtained from a lignocellulosic biomass.

8. The method of claim 7, wherein said biomass is one or more of pyrolysis oil, liquefied biomass, lignin, de-polymerized lignin, phenolated de-polymerized lignin, and liquefied lignin.

9. The method of claim 1, wherein the method includes heating a mixture comprising the hexose, the phenolic compound and the catalyst to a temperature sufficient to form a liquid mixture.

10. The method of claim 9, wherein said temperature is at least between 80° C. and 120° C.

11. The method of claim 9, wherein the molar ratio of hexose:phenolic rings of the phenolic compound is between 0.5:1 and 3:1.

12. The method of claim 11, wherein said molar ratio is at least 1, and said mixture further comprises water.

13. The method of claim 12, wherein said water is present in an amount of between 2 and 20 weight percent of the mixture.

14. The method of claim 1, wherein the reaction is conducted for a period of between 1 hour and 12 hours.

15. The method of claim 1, further comprising the step of:
removing unreacted phenolic compound from the liquid phenol-HMF product resin.

16. The method of claim 15, wherein the step of removing unreacted phenolic compound from the liquid phenol-HMF resin is performed using steam distillation.

17. A method for producing a liquid reaction product comprising a plurality of furyl and phenyl rings, neighboring furyl and phenyl rings being covalently linked to each other by a —$CH_2$— or a —CHOH— group, the method comprising:
converting a hexose to 5-hydroxymethyl furfural (HMF) in the presence of a-phenolic compound, a bifunctional Lewis acid catalyst and an ionic liquid, wherein the bifunctional Lewis acid catalyst catalyzes dehydration of hexose to HMF and promotes in-situ formation of said —$CH_2$— and said —CHOH— groups between the phenol and the HMF.

18. The method of claim 1, wherein ionic liquid is tetraethylammonium chloride, or tetramethylammonium chloride.

19. The method of claim 1, wherein ionic liquid is alkyl-imidazolium chloride.

* * * * *